Jan. 12, 1937.     B. L. GREEN     2,067,183
MEANS FOR PREPARING CONTROL SHEETS
Original Filed Feb. 7, 1930    13 Sheets-Sheet 10

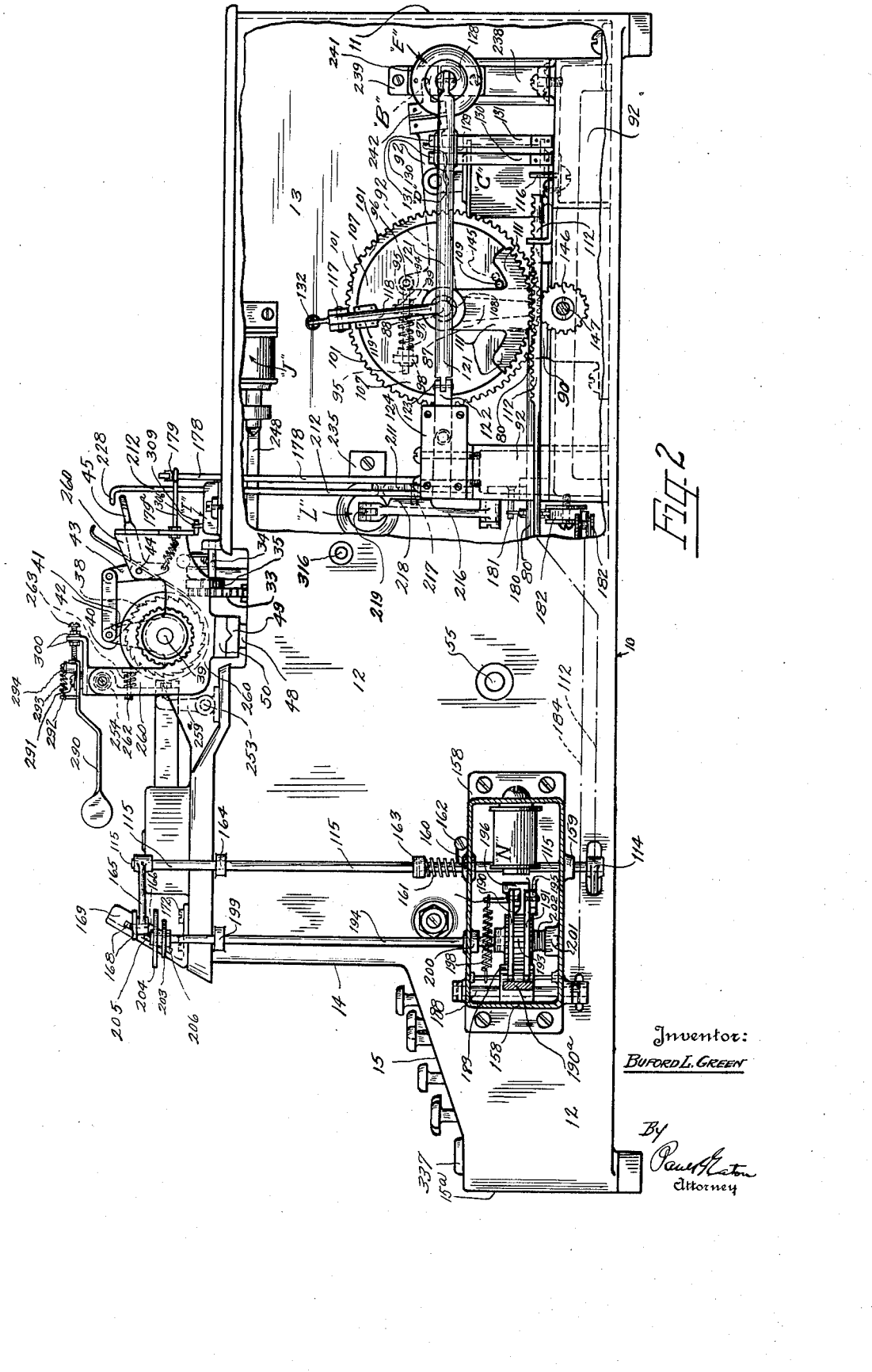

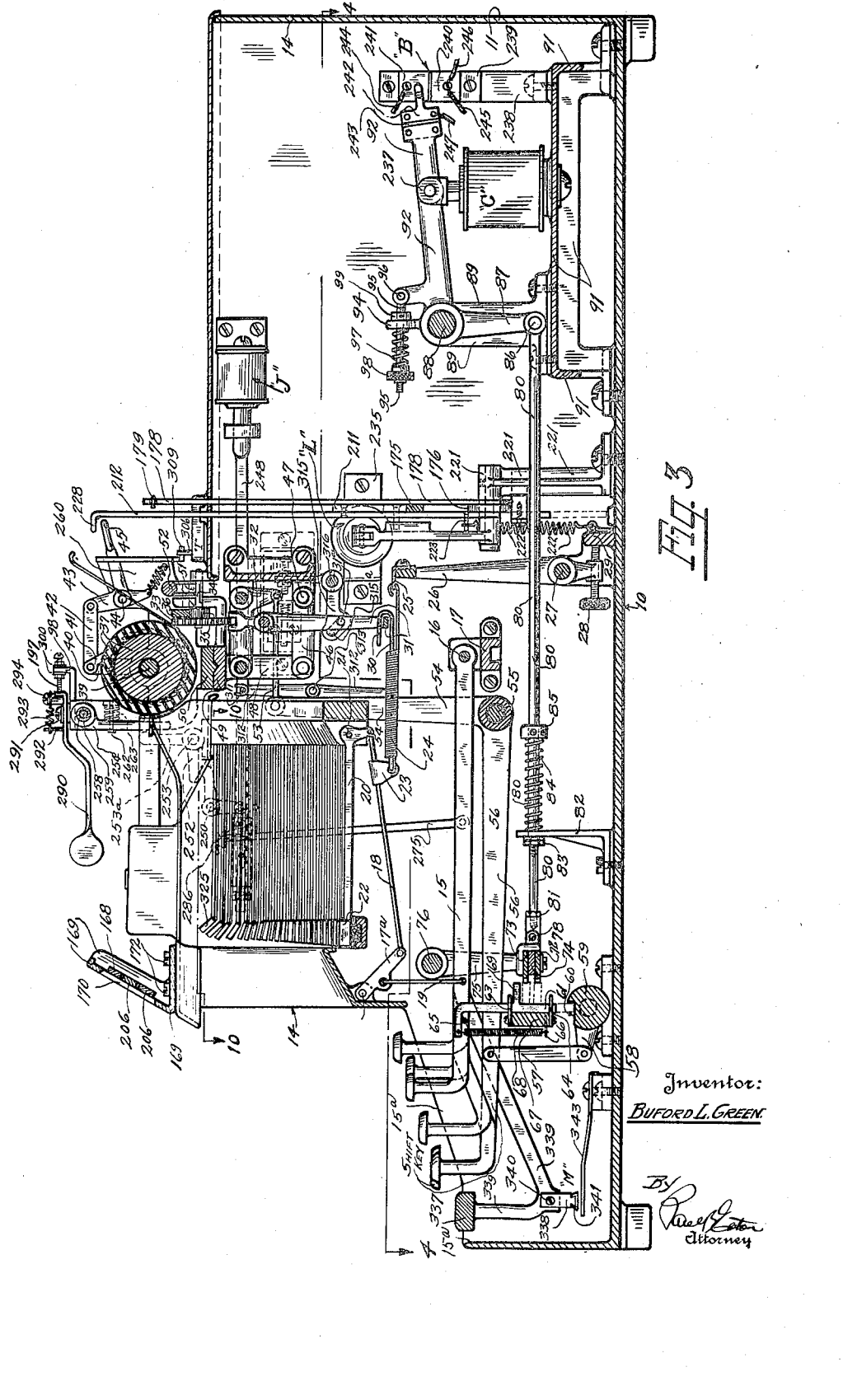

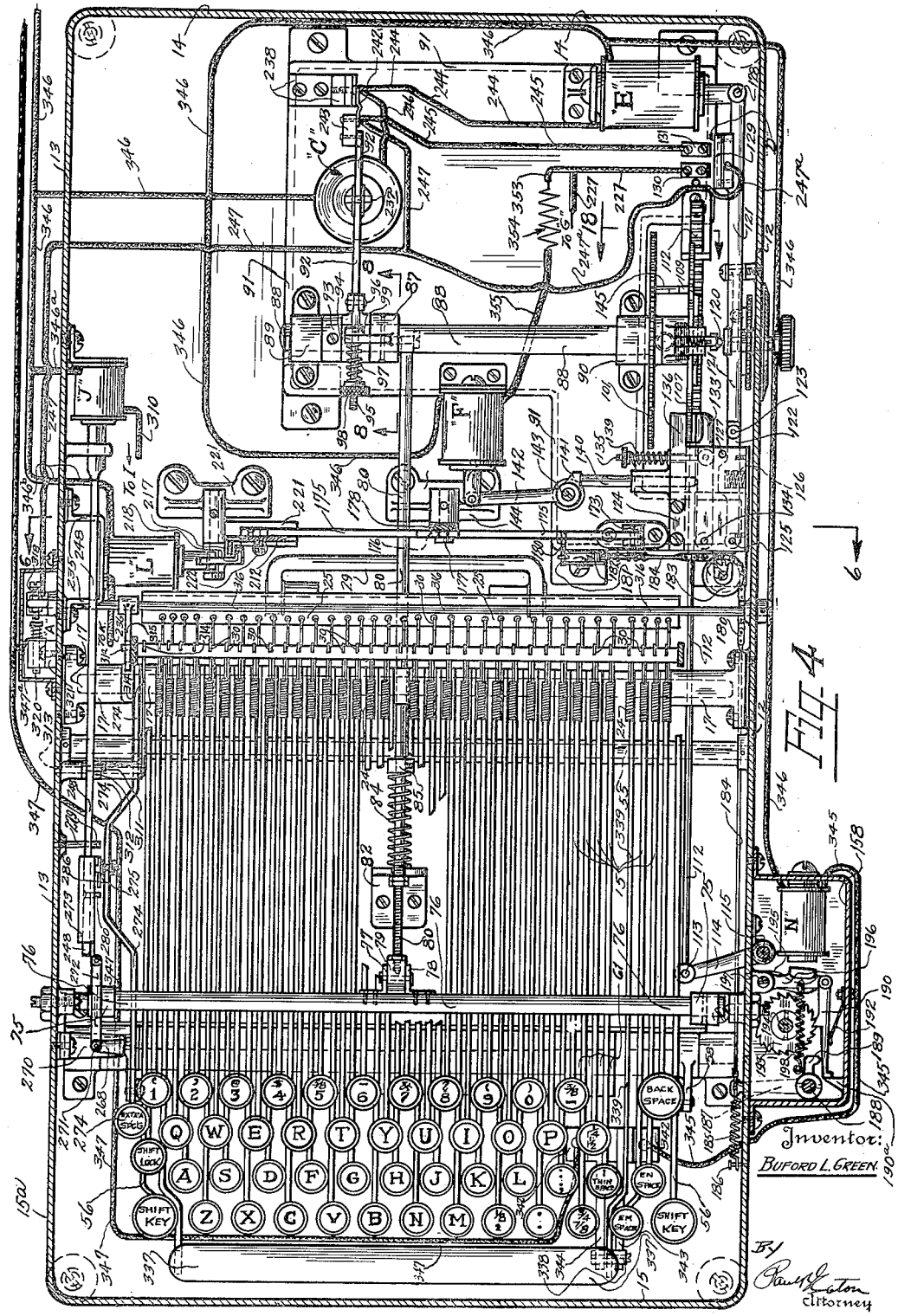

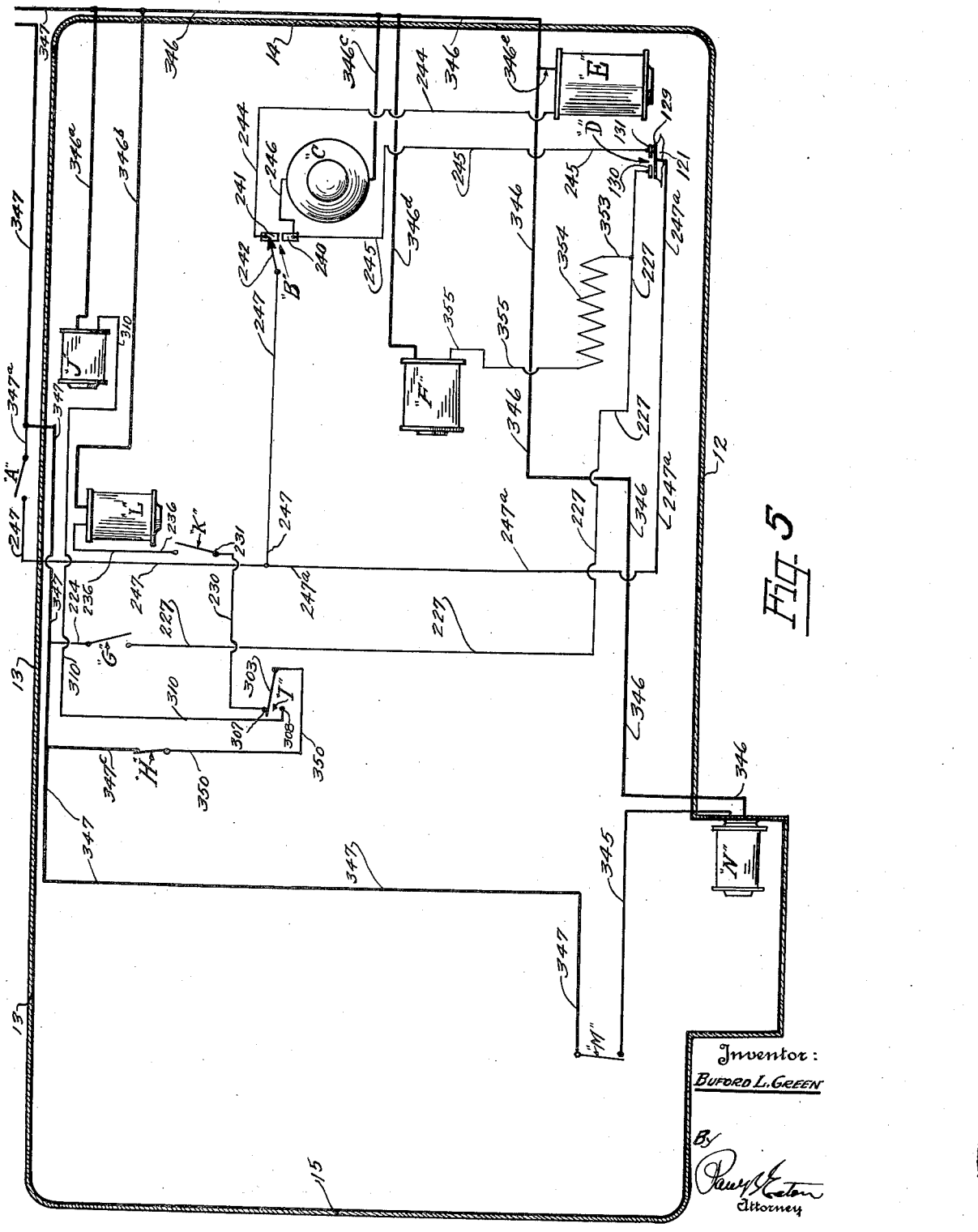

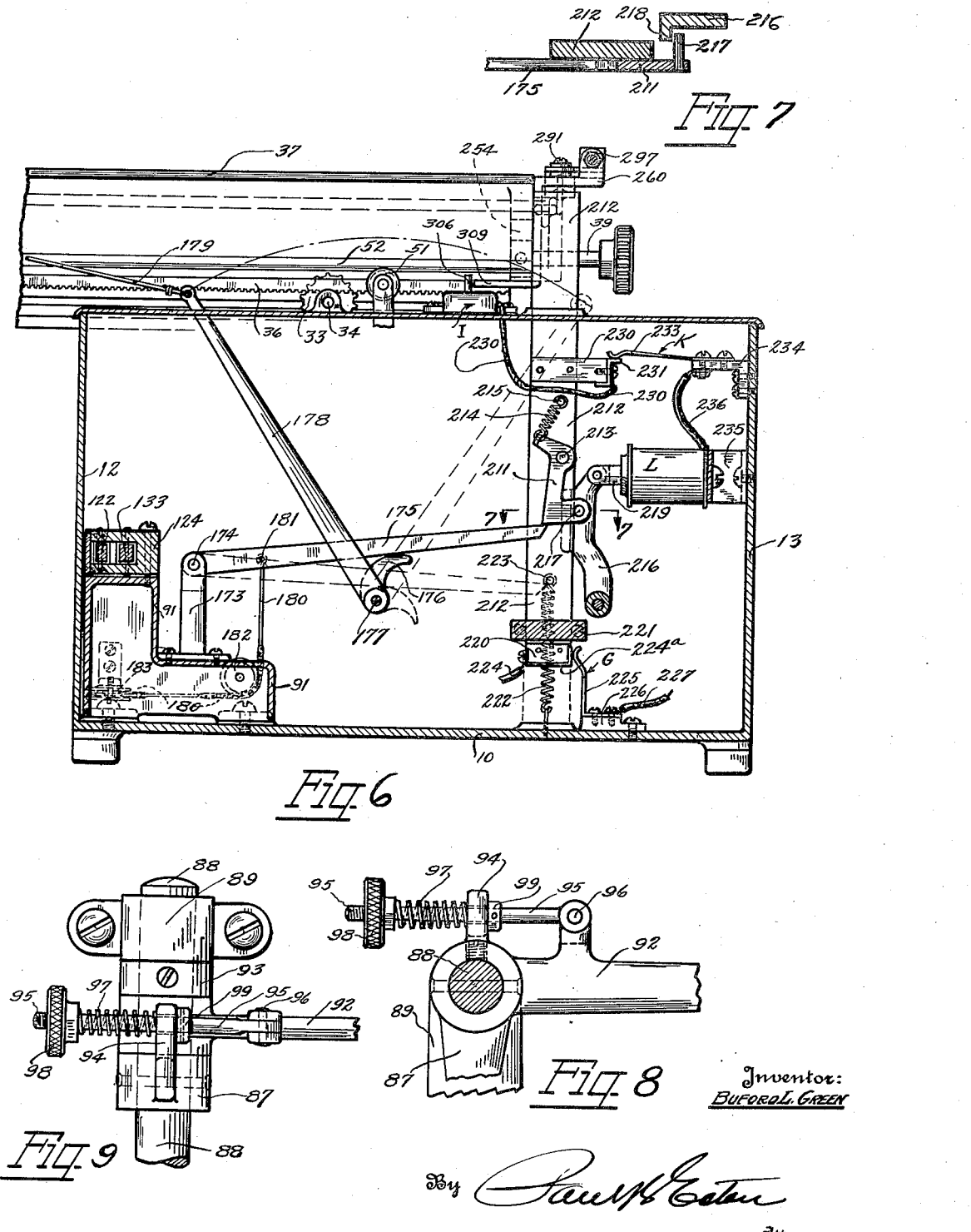

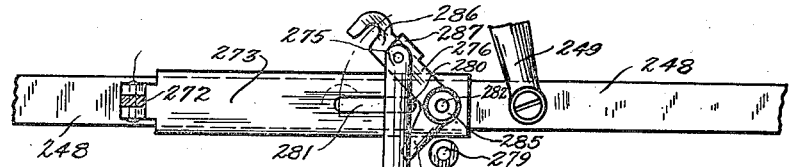
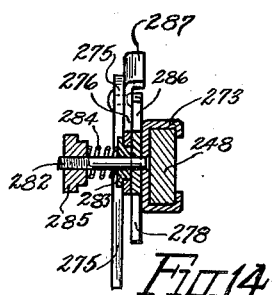
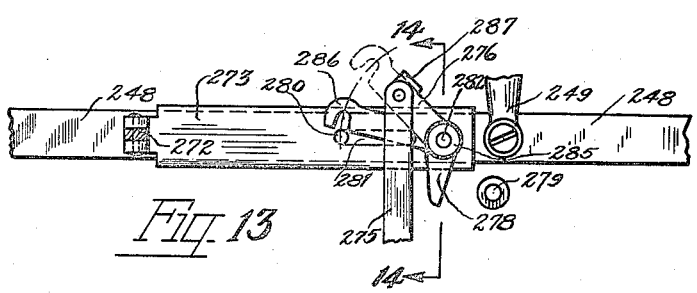
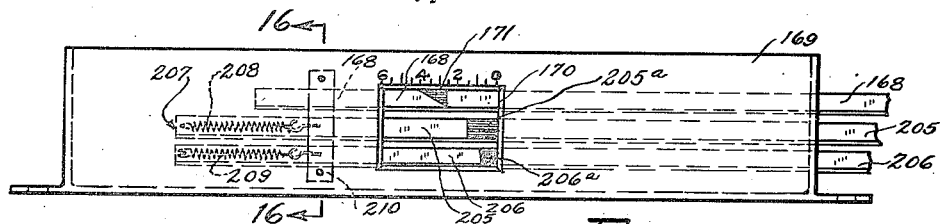
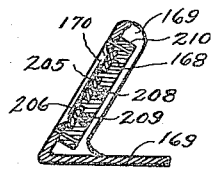
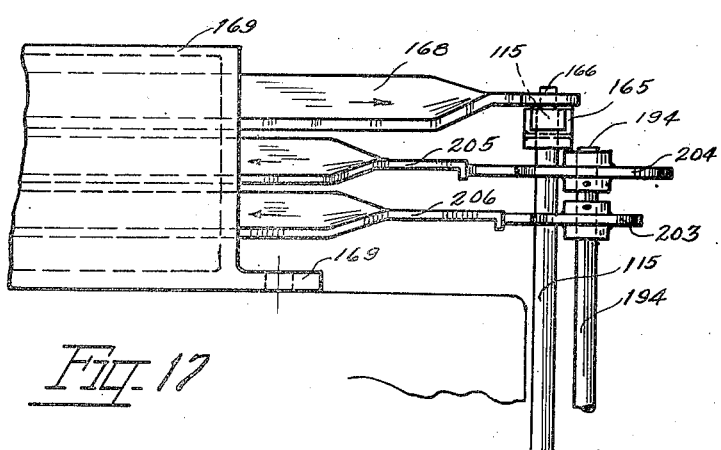

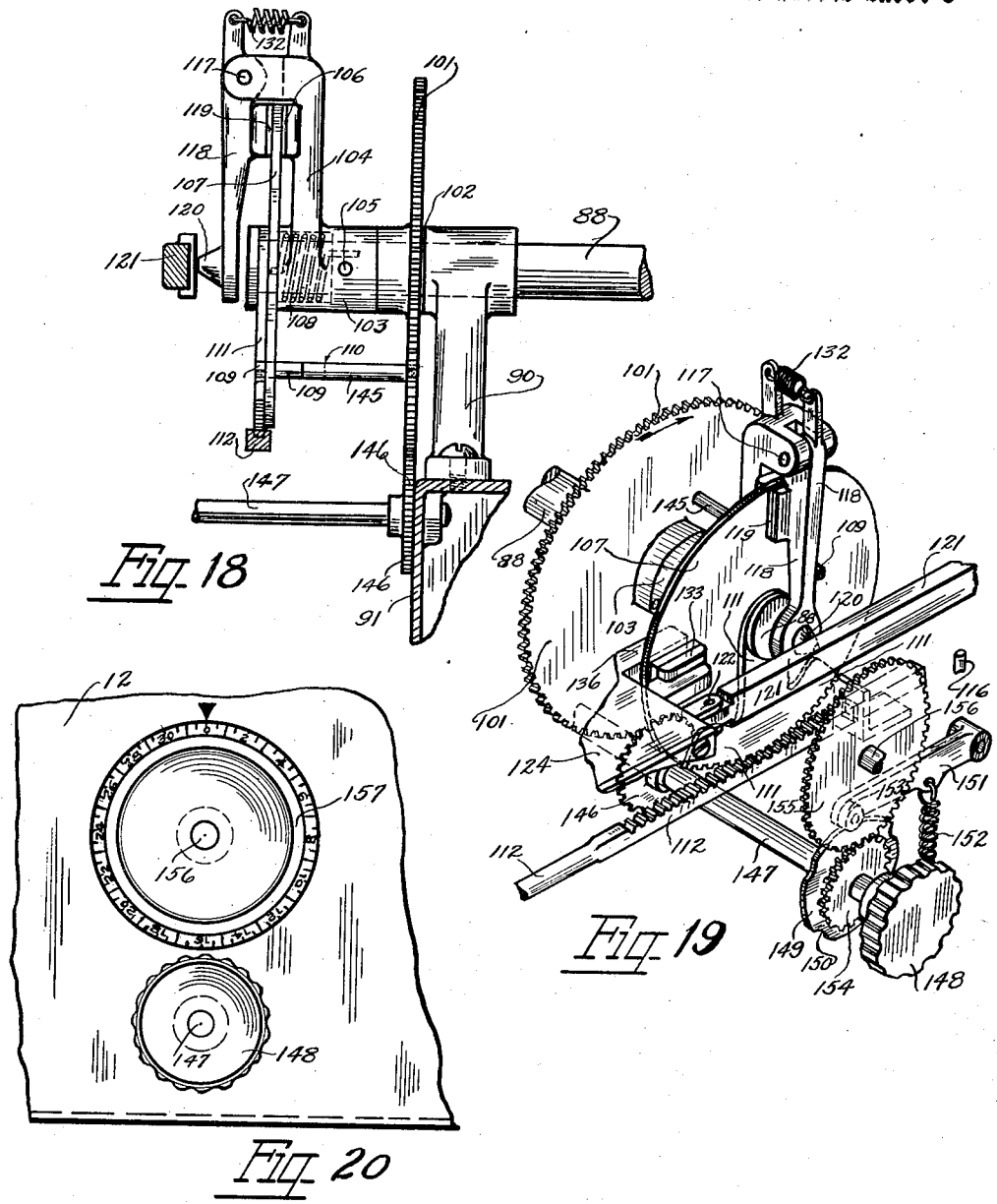

Inventor:
BUFORD L. GREEN
By Paul N. Eaton
Attorney

Jan. 12, 1937.  B. L. GREEN  2,067,183
MEANS FOR PREPARING CONTROL SHEETS
Original Filed Feb. 7. 1930  13 Sheets-Sheet 11
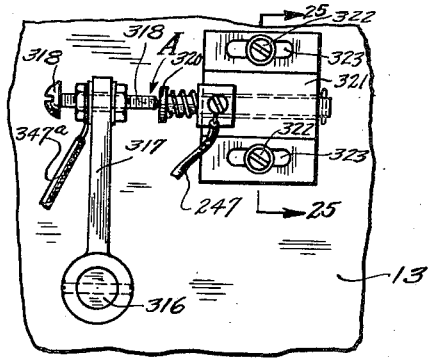
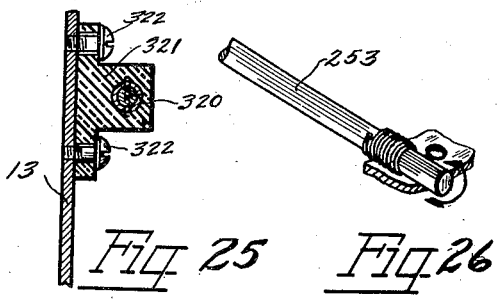
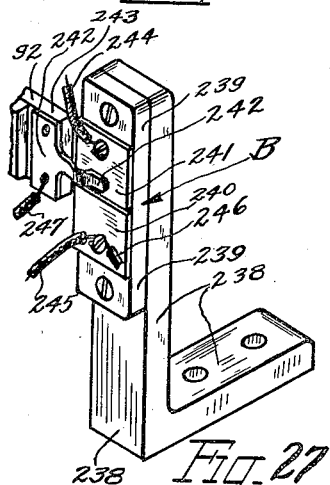
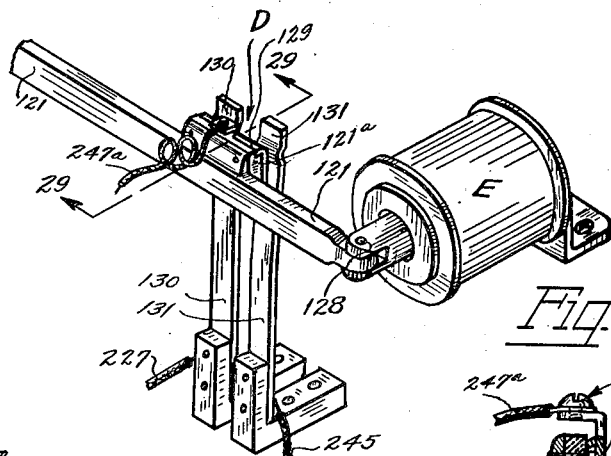
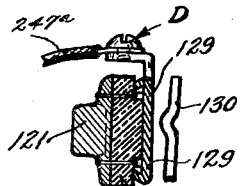
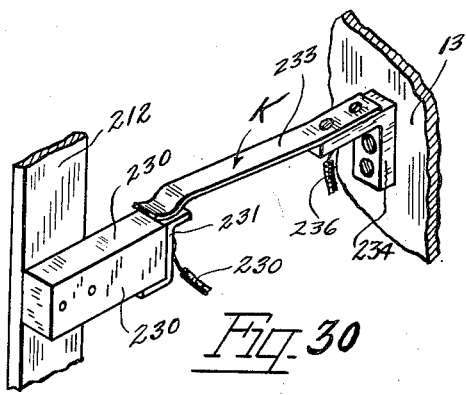
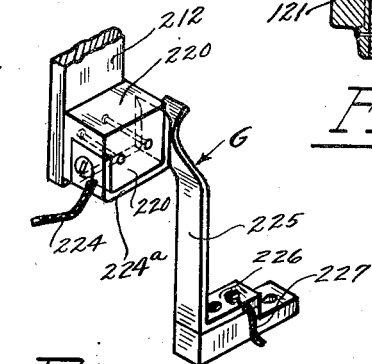
Inventor:
BUFORD L. GREEN
By
Attorney Jan. 12, 1937.　　　　B. L. GREEN　　　　2,067,183
MEANS FOR PREPARING CONTROL SHEETS
Original Filed Feb. 7, 1930　　13 Sheets-Sheet 12
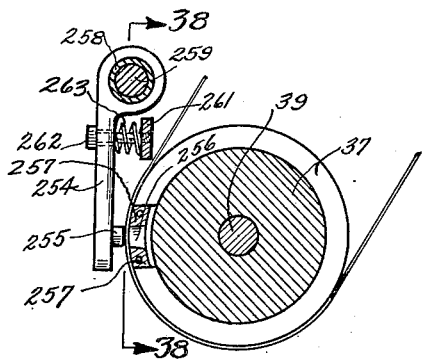
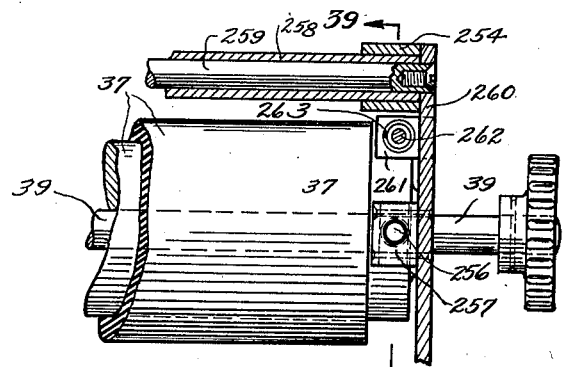
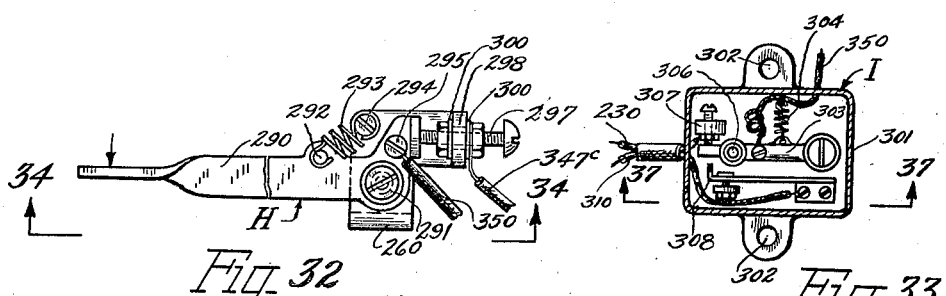
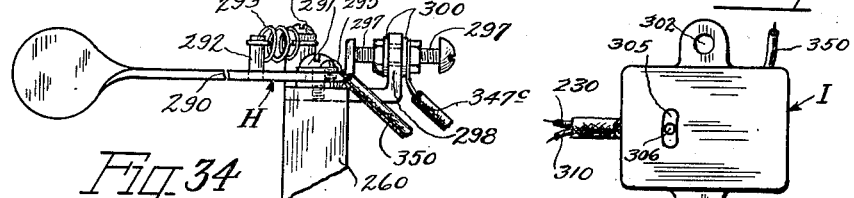
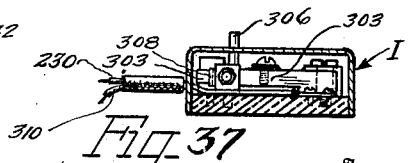
Inventor:
BUFORD L. GREEN
By
Attorney Jan. 12, 1937.  B. L. GREEN  2,067,183
MEANS FOR PREPARING CONTROL SHEETS
Original Filed Feb. 7, 1930   13 Sheets-Sheet 13
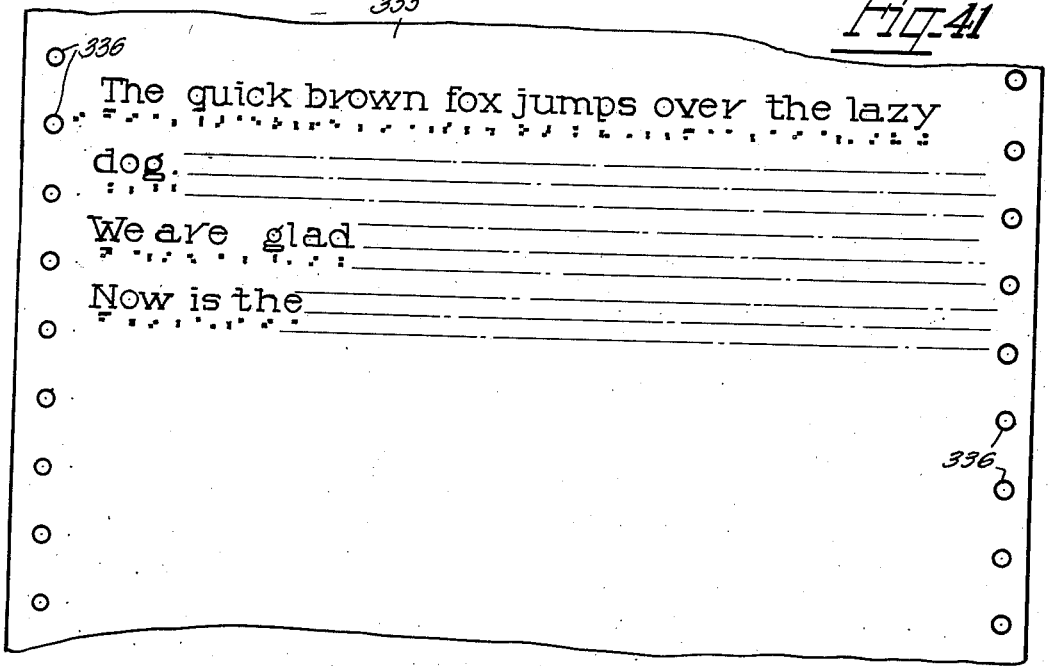
Fig. 40
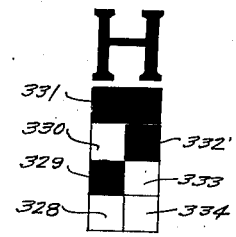
Fig. 41
Fig. 42
INVENTOR:
BUFORD L. GREEN
BY
ATTORNEY.

Patented Jan. 12, 1937

2,067,183

UNITED STATES PATENT OFFICE 2,067,183

MEANS FOR PREPARING CONTROL SHEETS

Buford L. Green, Charlotte, N. C., assignor to Semagraph Company, Dover, Del., a corporation of Delaware Application February 7, 1930, Serial No. 426,854
Renewed April 15, 1936

81 Claims. (Cl. 197—1)

This invention relates to means for preparing a control sheet for automatically setting type in a type-setting machine, and more especially to a mechanism adapted to be used by a reporter or other persons who can write off a typewritten page which will be written in both letters and code in a special typewriting machine by placing certain code matter immediately beneath each character printed by the typewriting machine, which control sheet is adapted to be later transferred to a special mechanism adapted to cooperate with a type-setting machine whereby the typesetting operation will be automatically performed without the necessity of the operation of the key board on the type-setting machine by an operator.

An object of my invention is to provide a special typewriter mechanism for writing out of reports and other matter which is desired to be set in a type-setting machine, which report can be used in an apparatus adapted to cooperate with a type-setting machine to eliminate the necessity of a key board operator for each type-setting machine.

Another object of my invention is to allow a reporter or typist to write out a written report, and to have a legible copy of the report as the same is made, and at the same time that the report is written out there will be printed in combination with the legible copy certain code characters so that when the written copy is transferred to a special apparatus adapted to cooperate with the type-setting machine that the type-setting machine which is equipped with my mechanism will automatically set the type from the report written out by the reporter or typist.

Another object of my invention is to provide a typewriting machine which is adapted to write at the same time both a legible copy of a report and code characters associated with said legible copy so that any typist can write out a report which may be placed in a type-setting machine to automatically set the type therein, and this proposition is particularly valuable when a report is received by mail, as it enables the report to be immediately transferred to the type-setting machine without the necessity of a type-setting operator taking the report and operating the type-setting machine to set the type.

Another object of my invention is to provide a typewriter for writing at the same time both legible characters and code matter associated with, but removed from the legible characters, which typewriter can be transferred to the scene of reporting and the copy made by the typist can be transferred to the newspaper office and immediately placed in certain special mechanisms adapted to cooperate with the type-setting machine to automatically set the type without the necessity of a type-setting operator.

Another object of my invention is to provide a special typewriting mechanism which is adapted to be used for writing out of matter, and at the same time placing in connection with the said matter certain code characteristics which enables briefs and other lengthy articles to be written, which can be transferred to a type-setting machine and reduced to printed form without the necessity of a type-setting operator operating the type-setting machine to set the type from the typewritten pages.

Another object of my invention is to provide a special typewriter which may be adapted for electric operation so that a printing telegraph machine may be built according to the specifications as hereinafter outlined for my special typewriter, so that reports may be received direct by wire and written out according to my plan on my special typewriter, and then transferred immediately to the type-setting machine without the necessity of a type-setting operator for the operation of the type-setting machine.

Another object of my invention is to provide a specially built typewriter for producing a typewritten report which is adapted to be later set by a special mechanism associated with the type-setting machine, said typewritten report having in connection with each letter a certain code which is adapted to be read by the special apparatus associated with the type-setting machine, so as to automatically set the type by the type-setting machine in using my specially prepared report, which comes from the typewriter, and said typewriter is adapted to be operated by any ordinary typist, and does not require the skill of the type-setting operator, it being evident that mistakes will be entirely eliminated because if a type-written copy is written out and properly proof read, and rendered perfect before being transferred to the type-setting machine, the type-setting machine will produce a perfect copy which will not require the necessity of a proof reader to go over the proof, as in the case where the personal equation of a type-setting operator enters into the operation of the type-setting machine.

Another object of my invention is to provide a special typewriter for printing a legible copy and at the same time printing code matter with each character printed by the typewriter, and to measure the space to be occupied by each character in a type-setting machine, and to indicate this space on indicating means associated with the typewriter, said indicating means also being provided with a registering device to indicate to the operator of the typewriter as to the amount of space remaining in the line, and also indicating means for showing at all times the expansibility of the space bands already in the line. By means of my special typewriter mechanism any ordinary typist can produce a copy having legible characters thereon and code matter associated with each copy, and the indicating device will indicate at all times the amount of space in a regular line of a type-setting machine which has been occupied by the type already in the line, and additional indicating means for indicating the amount of space remaining, and also additional indicating means to indicate to the operator of the typewriter just how much expansibility can be imparted to the space bands which are already in the line thus far written.

Some of the objects of my invention having been stated other objects will appear as the description proceeds when taken in connection with the accompanying drawings, in which—

Figure 2 is a side elevation of Figure 1 with parts broken away for sake of clearness;

Figure 3 is a cross-sectional view taken along the line 3—3 in Figure 1;

Figure 4 is a cross-sectional view taken along the line 4—4 in Figure 3;

Figure 5 is a wiring diagram of the electrical parts of my special typewriter;

Figure 6 is a cross-sectional view taken along the line 6—6 in Figure 4;

Figure 7 is a cross-sectional view taken along the line 7—7 in Figure 6;

Figure 8 is a cross-sectional view taken along the line 8—8 in Figure 4;

Figure 9 is a view looking down on Figure 8;

Figure 12 is an enlarged detail view of a portion of the means for connecting the extra space bar to the perforating mechanism;

Figure 13 is a view similar to Figure 12 but showing the parts in different positions;

Figure 14 is a cross-sectional view taken along the line 14—14 in Figure 13;

Figure 15 is an enlarged detail view of the spacing indicators;

Figure 16 is a cross-sectional view taken along the line 16—16 in Figure 15;

Figure 17 is an enlarged detail view of the means for operating the spacing indicators;

Figure 18 is an enlarged view partially in cross-section taken along the line 18—18 in Figure 4;

Figure 19 is a perspective view of the mechanism shown in Figure 18 looking from the left upper side of Figure 18;

Figure 20 is an enlarged detail view taken along the line 20—20 in Figure 1;

Figure 24 is an enlarged view showing a side elevation of a switch adapted to be closed by the escapement mechanism when a type bar is pressed downwardly;

Figure 25 is a cross-sectional view taken along the line 25—25 in Figure 24;

Figure 26 is a perspective view of a transversely and horizontally disposed rod for operating the perforations associated with the platen;

Figure 27 is a perspective view of switch B;

Figure 28 is a perspective view of solenoid E and switch D;

Figure 29 is a cross-sectional view taken along the line 29—29 in Figure 28;

Figure 30 is a perspective view of the switch K and associated parts;

Figure 31 is a perspective view of switch G and associated parts;

Figure 32 is a plan view of the switch H connected with the shift lever on the platen of the typewriter;

Figure 33 is a plan view of switch I with the top portion cut-away;

Figure 34 is a side elevation of Figure 32 taken along the line 34—34 in Figure 32;

Figure 35 is a plan view similar to Figure 33 but showing top placed thereon;

Figure 36 is a perspective view of the switch M and associated parts;

Figure 37 is a cross-sectional view taken along the line 37—37 in Figure 33;

Figure 38 is view taken along the line 38—38 in Figures 1 and 39;

Figure 39 is a cross-sectional view through the platen and perforating mechanism taken along the line 39—39 in Figures 1 and 38;

Figure 40 is a view of the alphabet showing the same in capital letters with my code associated therewith;

Figure 41 is an enlarged detail view of a specimen printing;

Figure 42 is a view of the sheet of paper produced by my special typewriting mechanism, and ready to be inserted into the mechanism associated with the type-setting machine.

Figure 1:
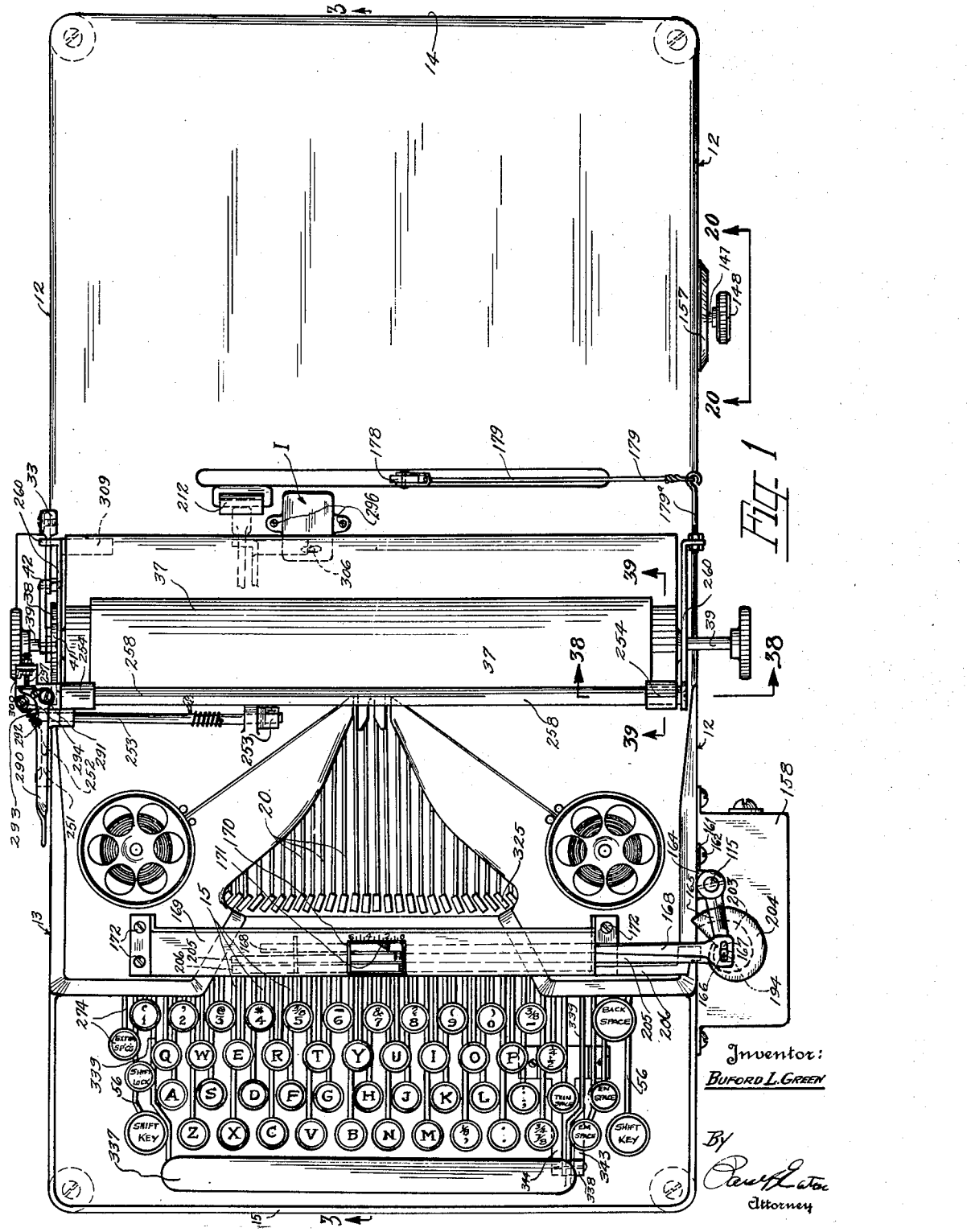
Figure 1 is a plan view of a special typewriter built according to my invention.
Figure 10:
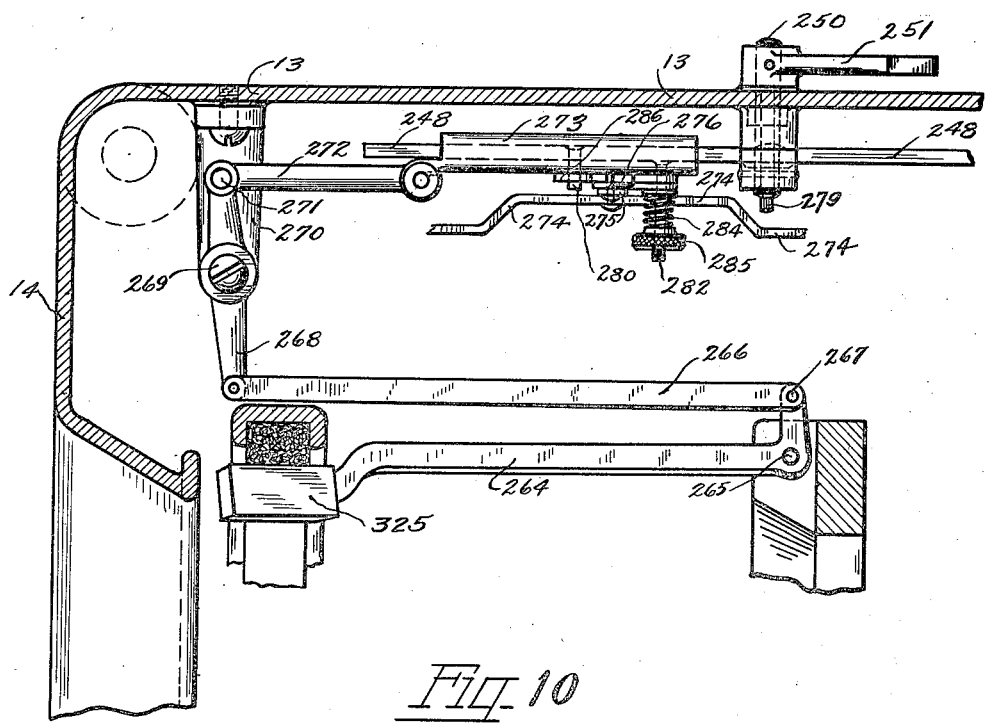
Figure 10 is an enlarged cross-sectional view taken along the line 10—10 in Figure 3, and showing the far side of the typewriting mechanism.

Referring more specifically to the drawings the numeral 10 indicates the base portion of a typewriter frame, which has a back wall portion 11 and side wall portions 12 and 13, with a front portion 14 and an extension portion 15a, which partially houses the keys of the typewriter. This typewriter has a plurality of key bars 15 which are pivotally mounted as at 16 on a member 17 which spans the distance between the side wall portions 12 and 13 and to the front portion 14 is pivotally connected a member 17a which has the free end thereof pivotally connected to a rod 18, and a rod 19 is pivotally connected intermediate the ends of the key bars 15 and also intermediate the ends of the member 17. This rod 18 projects forwardly where it is pivotally connected to type bar 20, the type bars being pivotally mounted as at 21, and having type 22, on the type pallet 325. The member 18 has a clip 23 secured thereon to which is secured a tension spring 24 which has its other end secured to a cross bar 25 which is secured to a lever 26, which is pivotally mounted as at 27 and has a set screw 28 in the lower end thereof which is adapted to be adjusted to abut against a projection 29 for the purpose of adjusting the position and tension of the key bars.

Also secured to the clip 23 is a hooked member 30 which hooks around the lower end of a lever 31 which lever is pivotally mounted as at 32, the upper end of said lever engaging an escapement wheel 33. This escapement wheel 33 is mounted on a shaft 34 and also on this shaft is a spur gear wheel 35 which meshes with a rack 36, all of the above described mechanism being standard typewriter equipment, but a description of the same is given in order that my invention as applied to a typewriter may be understood.

The escapement mechanism just described which is a conventional mechanism in a typewriter causes the typewriter to move one space when a key bar is touched and a complete description and showing of the conventional parts of a typewriter are not deemed necessary.

Mounted on the carriage is a platen 37 which has a ratchet wheel 38, which ratchet is mounted on a rod 39, and associated with this platen is a lever 40 which is pivotally mounted on the rod 39, and a dog 41 is pivotally mounted on this lever 40 and is adapted to engage the ratchet wheel 38 to advance the platen. Secured to the lever 40 is a member 42 which has pivotally connected to the other end thereof a bell crank lever 43 which is pivotally mounted as at 44 and has a backwardly projecting portion 45 which will be later described in connection with my mechanism.

The shifting mechanism (see Figure 3) comprises a member 46 pivotally secured as at 47 and the other end thereof has pivotally secured thereto an upwardly projecting portion 48, and on the upper end thereof a guide 49 for the carriage support 50, which carriage is also supported by a grooved roller 51 in which a rod 52 is adapted to roll to support the carriage. This mechanism of the carriage is conventional and which has been briefly described, and is adapted to be shifted upward and downward by means of shifting mechanism in which a rod 53 is pivotally connected to the upper end of a bell crank lever 54 which is pivotally mounted as at 55 and extends forwardly, said forwardly extending portion being designated by the reference character 56, and a downwardly projecting member 57 is pivotally connected to the portion 56, which member is pivotally connected as at its lower end to a lever 58 which is integral with a transversely disposed rod 59, which rod has a groove 60 therein, into which slidable members 61 are adapted to fit as letters of small case are being written, but when letters of larger case are being written, that is when the portion 56 is pressed downwardly it will cause the lower ends of the members 61 to rest on the portion 62. These members 61 are slidably mounted in plate members 63 and 64, and the key bars 15 have a pin 65 therein, over which the upper end of the member 61 is adapted to fit and a pin 66 is secured to a bar 67, and has hooked therearound a tension spring 68, which has its upper end secured to the upper and backwardly projecting portion of the member 61, the purpose of this arrangement being to normally force the members 61 downwardly against the member 59 either into the groove 60 or the portion 62 as the case may be. These members 61 have forwardly projecting portions 69 thereon, which are adapted to fit into slots 70 and 71, as the case may be, in bars 72 or 73 as the case may be. These bars 72 and 73 are fixedly secured to an intermediate bar or spacing bar 74, and members 75 are fixedly secured through the members 72, 73 and 74 and project upwardly where the members 75 are fixedly secured to a rod 76 which is pivotally mounted in the side walls 12 and 13 of the typewriter frame. Secured intermediate of the ends of the bars 72, 73 and 74 are members 77 and 78 in which is pivotally connected a block 79 into which a rod 80 is adapted to be threadably secured and locked in place by means of a lock nut 81. This rod 80 is supported by a member 82, in a slidable manner and nuts 83 are placed on the rod to limit its backward movement away from the members 61, and a compression spring 84 is loosely mounted around this rod 80, and has a collar 85 secured thereon to regulate the tension of said rod 80, said rod 80 projecting backwardly into the rear portion of the typewriter where it is connected as at 86 to a portion 87 which is fixedly secured on a transversely disposed rod 88. This shaft 88 is supported by supports 89 and 90 which are secured to a base 91 which in turn is secured to the base 10 of the typewriter frame.

This shaft 88 has loosely secured in close proximity to the support 89 a lever 92 and on one side of the lever 92 is mounted a collar 93 and on the other side the member 87, which has been previously described, is fixedly secured to the shaft 88, and this has an upwardly and sidewardly projecting portion 94, which projects over the lever 92, and has a hole therethrough in which a rod 95 is adapted to slide, said rod being pivotally connected to the lever 92 as at 96 and having a compression spring 97 therearound with a nut 98 thereon for purposes of adjusting the tension adapted to be placed on the lever 92, and a collar 99 is placed around said rod 95 to limit its backward movement. The mechanism just described allows the lever 92 to travel downwardly after the lever 87 has ceased traveling, because when the lever 87 pushes the rod 80 backwardly it causes the notches 70 or 71, as the case may be, to project against the projections 69 on the member 61, and it allows this lever 92 to travel a full stroke by being pulled by the solenoid C, as it is evident that the projections 69 on the member 61 when they enter the slots 70 or 71, as the case may be, limit the backward movement of the bars 72, 73 and 74. It might here be also stated that the depth of the notches 70 or 71, as the case may be, throughout the entire length of the plates 72 and 73 are different depths according to the width of the letter in a typesetting machine which corresponds to the letter on the key bar with which they are associated.

This shaft 88 has loosely secured thereon a gear wheel 101, and between the support 90 and the gear wheel 101 is a thin collar 102 and on the other side of the gear wheel 101 is a collar 103, which has projecting therefrom an arm 104, this collar and arm being secured to the shaft 88 by means of a pin 105, and this portion 104 has a friction plate portion 106 on one side thereof, which is adapted to fit closely against the disk 107, said disk 107 being loosely mounted on the shaft 88, but the portion 103 is hollowed out to have a diameter greater than the diameter necessary for receiving the shaft 88, and a tension spring 108 is secured therein, and one end of this tension spring pierces the disk 107, the purpose of this arrangement being to return the disk 107 to normal position as will be later described. This disk 107 has a pin 109 piercing therethrough and abutting out on both sides thereof, said pin projecting out toward the gear wheel 101 to the point 110 and projecting flush on the other side thereof with a segment 111 which is loosely mounted on the shaft 88 in close proximity to the disk 107. This segment 111 has teeth thereon which are adapted to engage with the teeth in a rack 112. This rack 112 extends backwardly and has the other end thereof pivotally connected as at 113 to a lever 114, which is fixedly secured on the lower end of shaft 115 on the outside of the typewriter frame, the purpose of which is to indicate the spacing of the typewriting machine, and which will be later explained. The backward movement of the bar 112 is limited by the pin 116 which is mounted in the base 91.

Pivotally secured to the upper and outer ends of the portion 104 as at 117 is a member 118 which has a friction portion 119 on the inner surface thereof, which is adapted at times to press against the disk 107, and the lower end of this member 118 has an outwardly projecting conical portion 120 which is adapted to engage a bar 121, which is pivotally connected to a bar 122 as at 123, said bar having the other end thereof connected pivotally to a block 124 as at 125, and a compression spring 126 is adapted to press this member 122 inwardly against a pin 127 at all times. The other end of the bar 121 is pivotally connected as at 128 to a solenoid E, as will be later described, and intermediate the points 128 and 120 there is a contact portion 129 which is insulated from the rod 121 and which is adapted to press against the switch parts 130 and 131 to close the circuit, and this switch mechanism composed of portion 129 and the contact parts 130 and 131 is designated as switch D. The member 118 is normally held away from the disk 107 by means of a spring 132. The block 124 also supports a lever 133 which is pivotally mounted as at 134, and has pivotally secured thereto a rod 135, a friction portion 136 is adapted to press against the disk 107, this rod 135 projects through the case 124 and has a compression spring 139, which normally pulls lever 133 against disk 107. This block member 124 has slidably mounted therein a rod 140 which is adapted to be pushed by the projection 141, which projects out from a bell crank lever 142, which is pivotally mounted as at 143, and the other end of this bell crank lever 142 is pivotally mounted as at 144 to a solenoid F, so that when the solenoid F is energized it will push the rod 140 inwardly and push the member 133 away from the disk 107 and release the brake thereon.

As above described the disk member 107 has the pin 109 piercing therethrough, and that portion of the pin 109 which projects to the lefthand side of the disk 107 as seen in Figure 18, projects into the path of the segment 111, and as the disk 107 is forced in a clock-wise direction in Figure 19, the pin 109 presses against the segment 111, and forces it along with the disk 107 and will therefore move the rod 112 to the left as seen in Figure 19. A pin 145 is secured in the gear wheel 101 and this fits in front of the pin 109, as seen in Figure 18, so that when the gear wheel 101 is advanced in a counter clockwise direction as shown in Figure 19 to bring the pin 145 up to the point shown in Figure 19, the tension spring 108 will cause this disk 107 to follow the disk 101 and cause the pin 109 to follow close behind the pin 145. The purpose of this arrangement is that by placing the pin 109 back to the predetermined distance it allows the wheel 107 to move a predetermined distance before the pin 109 engages the segment 111 to advance the rod 112. I adjust the mechanism above described by having a gear wheel 146 secured on a rod 147 which rod is supported in the side wall of the typewriter, and has a knob 148 thereon for adjusting the same, and also secured on this rod 147 is a plate 149 which has cavities 150 therein, which indicate the unit of measurement as the same is turned. I pivotally mount in the frame of the typewriter a lever 151 which is normally pressed downwardly by a spring 152, and this lever 151 has a roller 153 thereon which is adapted to press against the plate 149 and to fall into the cavities 150 and indicate to the operator that one unit of measurement has been passed. This rod 147 has also secured thereon a gear wheel 154, which meshes with a gear wheel 155, which is mounted on a shaft 156, and has thereon a dial 157 which registers units of measurement indicating how far back the pin 109 has been set before it will begin to indicate measurement on the indicating mechanism on the typewriter, by engaging pin 109.

As previously described the rack 112 is connected to the vertically disposed shaft 115, and this shaft 115 pierces the upper and lower portion of the casing 158 which is mounted on the side 12 of the typewriter frame, this rod or shaft 115 being mounted in bearings 159 and 160, and a coiled tension spring 161 is secured around this shaft 115, and one end of the coiled spring is secured to the side of the typewriter by means of a screw 162, and the other end of the spring is secured to a collar 163 which is fixedly secured to the rod 115. Near the upper end of the rod 115 is a bearing member 164, in which the rod 115 is adapted to work, and on the upper end of the rod or shaft 115 is a lever 165 which is fixedly secured at one end thereof to the shaft 115, and the other end thereof has an upwardly projecting pin 166, which works in a slot 167 which is in the end of an indicator member 168, said indicator member projecting into a housing 169, which housing has an opening 170 therein, and the indicator member 168 has the marking 171 thereon, which indicates the amount of space remaining in the last approximately one inch of the line, and indicates to the typist that a certain amount of space still remains into which letters may be placed to fill out a line of proper length for the type-setting machine with which the copy made by this typewriter is adapted to be used. This casing 168 is secured on top of the typewriter by means of screws 172.

Mounted on the base 91 is a projection 173 which has pivoted in the upper end thereof as at 174 a lever 175, which is adapted to be forced upwardly by a cam 176 which is on a rod 177. To this rod is fixedly secured a lever 178 which lever 178 has a flexible member 179 secured thereto, which is secured to the carriage by means of hook 179a, so that when the carriage is swung to the right by the operator or as it appears as swung entirely to the left in Figure 6 and ready for the writing of a new line, the lever 175 will be raised upwardly, and will be allowed to gradually recede as the line is being written by the typist. As this lever 175 is raised upwardly the other indicating mechanism is operated, which is done by means of the flexible member such as a chain 180 being secured as at 181 to the lever 175, and in the base 91 is mounted a wheel 182, and said chain or flexible member 180 also passes around a wheel 183, and extends forwardly where it is connected to a rod 184, and the front end of the rod is connected to a tension spring 185, which is secured to a pin 186, in the typewriter frame. Connected at the point where the spring 185 and the rod 184 are joined together is a lever 187 which is mounted on the vertically disposed shaft 188 mounted in the casing 158.

Secured on this pin 188 is a dog 189 which is adapted to coincide with two pivoted pawls 190 and 191, each of which has a leaf spring 192 to press the same inwardly against a ratchet wheel 193, which ratchet wheel is mounted on a vertically disposed shaft 194. The lower pawl 191 is mounted on a lug 195 projecting from the side of the typewriter. The dog 190 is pivotally connected to the member 196, which has an enlarged portion thereon adapted to be pulled by the magnet N, and this member 196 is pivotally connected to the side of the typewriter as at 197, and is adapted to be pulled toward the ratchet wheel 193 by means of a spring 198. The ratchet wheel 193 is fixedly secured on the upwardly projecting shaft 194, which shaft is mounted in bearings 199, 200 and 201, and just above the bearing 201 is a torsion spring 202 which is adapted to return the shaft 194 to normal position after operation, and to cause the cams 203 and 204 to assume the position shown in Figure 1, when the straight surface portion of the cams 203 and 204 will press against the sides of indicator levers 205 and 206 and thus causes the shaft 194 and associated parts to assume a position of rest. The shaft 194 has two irregular cams 203 and 204 fixedly secured thereon, and these cams are adapted to operate indicator levers 205 and 206, said indicator levers projecting into the casing 169 and passing across the opening 170 to the point 207, and near the ends of these levers 205 and 206 are secured tension springs 208 and 209 and a cross piece 210 is secured to the back of the casing 169 and to this cross piece is secured the other end of the springs 208 and 209, the purpose of these springs being to return the indicator members 205 and 206 to normal position, or to move the same to the right in Figure 15.

The lever 175 which has been described, is adapted to cooperate with a member 211 which is pivotally mounted on an upwardly projecting member 212 as at 213, and the upper end of this member 211 has secured thereto a tension spring 214 which has its upper end secured to the member 212 by means of pin 215, and the lower portion of this member 212 projects to the right in Figure 6, and has a pin 217 secured therein, which projects outwardly into the path of a lug 218 which is integral with the member 216, and the upper end of the member 216 is pivotally connected to a rod 219 of the solenoid L which is secured to the side wall 13 of the typewriter. This member 212 has secured on the lower end thereof an insulating block 220. The member 212 is supported by means of a bracket 221 which is secured to the base plate 10 of the typewriter, and projects outwardly as shown in Figure 4 and has a slide therein, in which the lower end of the member 212 slides, with a coiled spring 222 being secured to the base of the typewriter at one end, and having the other end thereof secured to a pin 223, which normally forces the member 212 downwardly. This insulating block 220, on the lower end of the member 212, has secured thereto a metallic member 224a, and to one side of 224a is secured the wire 224, and on the other side thereof a leaf spring 225 of the switch mechanism G is adapted to press when the rod 212 is in uppermost position, and the base portion of this member 225 is connected to an insulating block 226, and the wire 227 leads therefrom, the wiring connection being later explained.

As previously described the ratcheting mechanism for the platen has the lever 45 projecting outwardly into close proximity to the member 212, and the member 212 has a hook 228 on the upper end thereof, which is adapted to engage the lever 45 when the member 212 moves downwardly to ratchet the platen of the typewriter ready for writing another line. This member 212 has a block 230 secured thereon which insulates a switch member 231 of switch K from the portion 212, and this switch member 231 has secured thereto a wire 230 which leads to a switch mechanism "I" which will be later explained. The member 231 forms a part of the switch mechanism K and a leaf spring member or contact member 233 is adapted to contact with the member 231 when the member 212 is in raised position, this member 233 being secured to an insulating block 234, which is adapted to be secured to the side wall 13 of the typewriter, and below the contact part 233 is secured a solenoid L, by means of a bracket 235 secured to the sidewall 13 of the typewriter frame. A wire 236 leads to solenoid "L" to connect switch K and solenoid "L" together, the operation of which will be later explained in the method of operation.

When the lever 175 raises the parts to the position shown in Figure 6 contact will be made between 231 and 233 which will energize solenoid "L" which will pull the member 211 away from the lever 175, and the tension spring 222 will pull the member 212 downwardly quickly, and the hook 228 will engage the lever 45 and ratchet the platen of the typewriter.

Referring to Figures 2, 3, 4 and 27 it will be seen that the lever 92 has secured thereto a rod 237 which goes into the solenoid "C" mounted on the base 91, and also mounted on this base 91 is the L-shaped member 238, which projects upwardly and has an insulating block 239 secured thereon with contact plates 240 and 241, and the end of the lever 92 has secured thereon a contact point 242 which is insulated from the lever 92 by means of an insulating member 243, and this switch mechanism broadly is designated by the reference character B. Leading from the contact plate 241 on the support 238 is a wire 244, and leading from the contact point 240 is a wire 245, and a wire 246, the connection of the operation of which will be later explained. From the contact point 242 also the wire 247 is led to switch "A" the operation of which will be explained in the method of operation and wiring diagram.

Figure 11:
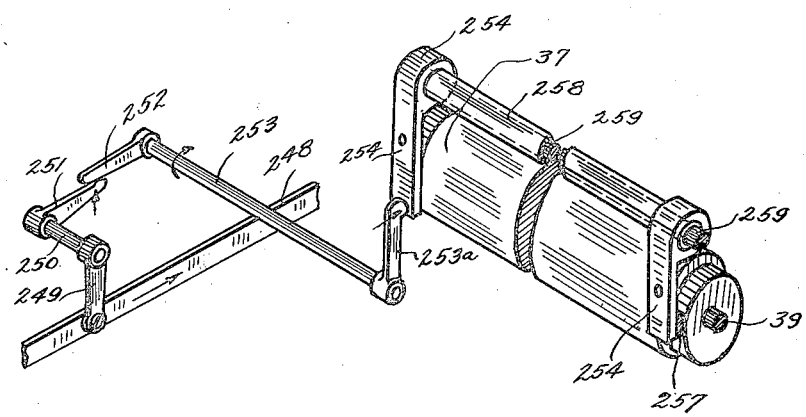
Figure 11 is a perspective view of a portion of my perforating mechanism.
Figure 21:
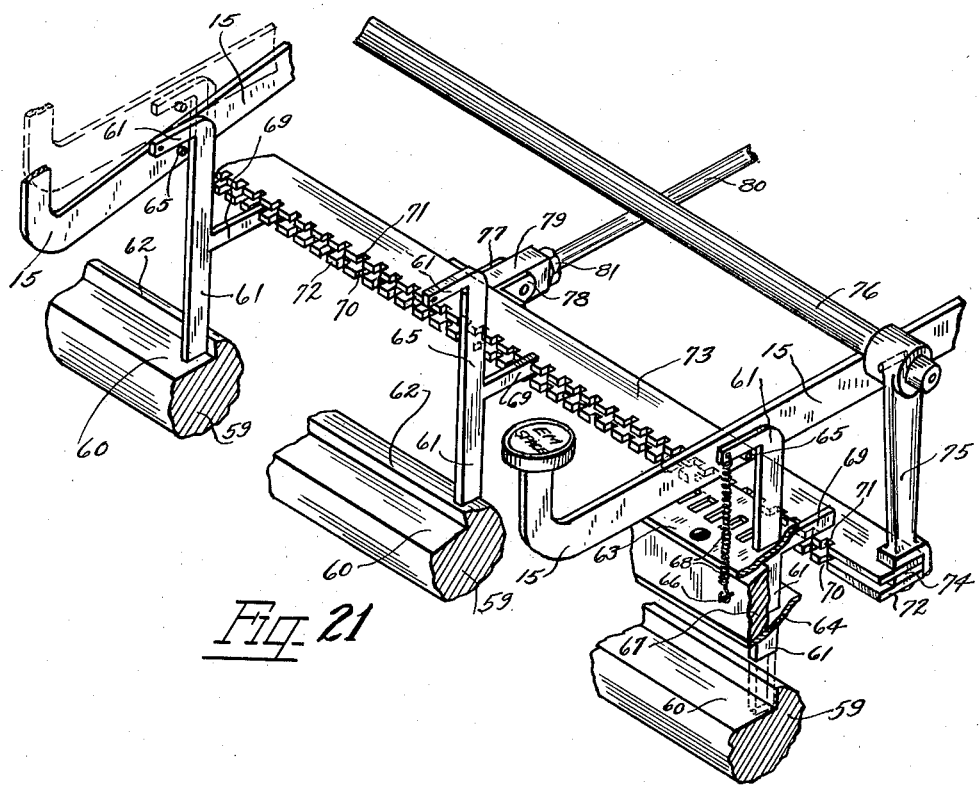
Figure 21 is a perspective view of a portion of the means operated by the type bars to cooperate with the spacing mechanism.
Figure 22:
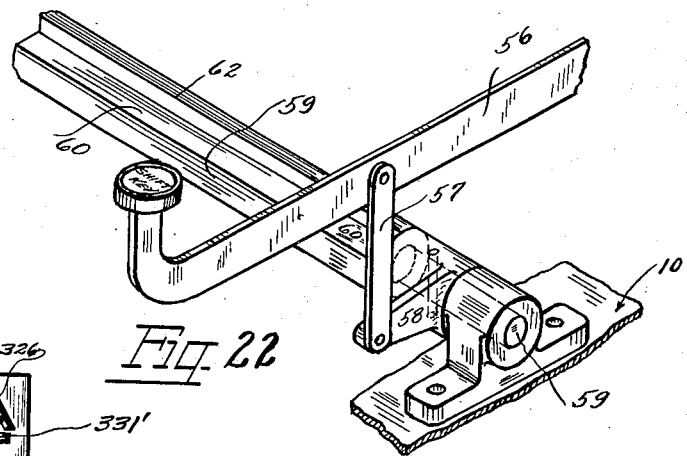
Figure 22 is a perspective view of a type bar connected to the shifting mechanism.

In making a typewritten copy with my machine and printing code in connection with each letter it is necessary that some provision be made to insure that the typewritten copy is placed in the type-setting machine is exactly the same position as it occupied in the typewriter, and to that end I provide a perforating mechanism for perforating the sheet of paper as it is written in the typewriter. This perforating mechanism (see Figures 1, 2 and 11) comprises a solenoid "J" which has mounted therein a rod 248 which projects back toward the typist and being supported at the end next to the typist by a lever 249 which is fixedly secured on a rod 250 which is rotatably mounted in the side of the typewriter frame 13, and on the other end of this rod 250 is a lever 251 which is adapted to engage the free end of a lever 252 which is secured on a shaft 253 which projects to a point in alinement with the left-hand end of the platen of the typewriter speaking with respect to the operator facing the typewriter ready for writing, and has the lever 253a, fixedly secured thereon, which projects upwardly, and the upper end of this lever 253a is adapted to engage a perforator 254, (see Figures 38 and 39) which perforator has a punch 255 thereon, which is adapted to mesh with a hole 256 in a block 257, which block is fixedly secured on the typewriter carriage frame 260 immediately outside of the end of the platen 37, and does not rotate with the platen but remains with the carriage.

On each side of the carriage there is similar arrangement as above described, and these perforators 254 extend upwardly and are fixedly secured to a transversely disposed tube 258 which tube is mounted on a rod 259, which rod is supported at its ends by the carriage frame 260, and the carriage frame 260 has an inwardly projecting lug 261 into which a headed pin 262 can be screwed, said headed pin having its head on the outside of the perforator 254. The tension spring 263 is placed between the perforator 254 and the member 261 and normally forces the punch 215 out of the hole 256 after the perforator is operated.

Secured in the typewriter is an extra type bar which is designated by the reference character 264 which is pivoted and operates in the same manner as the conventional type bars, but which is operated by means other than those employed in the conventional type bar. The purpose of this extra type bar is to have a code signal thereon with no letter, which will give an extra space at the beginning of a line, as it is conventional in type-setting to place extra space in a line when desired for purposes of proper spacing after the line of type has been set. This type bar 264 is pivoted as at 265, and has a conventional link 266 pivotally connected thereto as at 267, and the other end of link 266 is pivotally connected to a lever 268 which is pivoted intermediate its ends as at 269 on a fixed projection 270 which extends from the side wall 13 of the typewriter, and the other end of this member 268 is pivotally connected as at 271 to a rod 272, and the other end of rod 272 is pivotally connected to a slide 273 which is slidably mounted on the rod 248, which rod has already been described.

The key bar which operates the type bar 264 is indicated by the reference character 274, which is connected to the pivoted member 276 on slide 273 by a bar 275. The pivoted hook member 276 is pivotally secured to the slide member 273 as at 282. The slide member 273 has a slot 281 therein, so as to permit a pin 280 secured in rod 248 to slide normally in the slot 281 when the perforating mechanism is adapted to be operated by the rod 248, without giving any extra spacing unless the extra spacing bar is pulled downward to cause the latch member 276 to cause the hook member 286 to engage the pin 280 in the rod 248. The pin 282 is mounted in the slide member 273 and this pin member 282 has a flanged collar 283 mounted thereon and is held in position by the tension spring 284, which is held in position by the nut 285, and the portion 283 presses firmly against the hook 286, and the member 276 has the sidewardly projecting hook 287 which is adapted to press against the hook 286 to bring it down over the pin 280, and then to return to normal position where key bar 274 is released leaving the hook 286 over the pin 280, the hook 286 having the projection 278 integral therewith, so that a pin 279 mounted in the side wall 13 of the typewriter will raise the hook 286 out of engagement with the pin 280 when the bar 248 is pulled by the solenoid "J".

Mounted on the carriage framework 260 (see Figure 1, 32 and 34) is a lever 290 which is pivotally mounted as at 291. This lever has a pin 292 thereon which is secured to a tension spring 293, the other end of which is connected to a screw 294 which is secured to the member 260, and a screw 295 is secured to this lever, and to this screw a wire 350 is secured, and a contact part or screw 297 is secured in an upstanding portion 298 of the portion 260, and a wire 347c is connected thereto, the screw 297 being insulated from the portion 298 by the insulating washers 300. The wire 350 leads to a switch mechanism "I" which is mounted on the framework of the typewriter as shown in Figure 1 and details of which are shown in Figures 33, 35, and 37.

This switch mechanism "I" has a casing 301 which is adapted to be secured to the framework of the typewriter at the holes 302 by means of screws 296, and there is pivotally mounted inside of this casing a lever 303, the wire 350 being connected to this lever 303. The coiled spring 304 is secured to this lever, and also to the casing which tends to hold the lever in the position shown in Figure 33. Projecting upward from this lever is an insulated pin 306 which projects through the slot 305 in the top of the casing, and the contact points 307 and 308 are placed within the casing 301, and when the platen of the typewriter is returning to normal position the lug 309 on carriage frame 260 (see Figure 6) presses against the pin 306 and forces the lever 303 over against the contact 308 and closes the circuit leading from the open switch mechanism "H" on the platen, and the current passes out through the wire 310 to the solenoid "J" which operates the perforating mechanism, when switch "H" is closed by releasing lever 290.

In returning the carriage to begin writing a new line the lever 290 is pressed downwardly in Figure 32 or to the right by the operator and thus opens the contact point 297 in switch mechanism "H" mounted on the carriage mechanism 260, and when the carriage is returned to a position to begin writing a new line with the switch closed as above described, that is with the lever 303 in contact with point 308 no current can go through this switch mechanism "I" until the operator releases the lever 290, which is automatically closed by the spring 293, and this causes the perforating mechanism to operate by passing a current through the solenoid "J", and operating the rod 248 and associated parts. At the same time that the perforating mechanism operates the rod 248 having the pin 211 therein which runs in the upper forked ends of the lever 312 which is pivoted intermediate its ends as at 313, and to the lower end of lever 312 is connected a hook 314, which hooks around the bar 31 and which controls the escapement mechanism, and this allows the carriage to move one space to the left, the above parts being shown in Figure 3.

The hand of the operator will be released from lever 290 before the perforating mechanism operates, and when it does operate and causes the carriage to move one space, the arm 303 will swing over against contact 307 and the switch "H" being closed will cause solenoid "L" to operate to move the platen to a new line position, and in so doing switch "K" will be opened.

When the lever 290 is seized by the operator and the carriage is returned to starting position, the carriage will move against pin 306 (see Figures 33 and 35) and will close switch "I", that is by forming contact between switch 303 and 308 and this will energize solenoid "J" and operate the perforating mechanism and also the type bar 264 for placing the extra space code characteristic at the beginning of the line already written if such extra spacing type bar 264 is connected with the perforating mechanism. This operation takes place while the hand of the operator is engaging lever 290 and this engagement of lever 290 moves the carriage mechanism one space further to the right than the marginal line and the carriage being held in this position momentarily by the pressure of the hand of the operator causes the extra space code characteristic to be placed in the space immediately preceding the marginal line on the sheet. Upon release of lever 290 by the operator, the switch "I" will be closed as shown in wiring diagram in Figure 4 by switch 303 contacting with point 307 which will energize magnet "L" and operate the mechanism for moving the platen to a new line position. The extra spacing code is shown at the beginning of the first line in Figure 42.

When the carriage moves one space to the left the projection 308 will move away from the pin 306 and cause the lever 303 to assume the position shown in Figure 33 and the switch will be broken, and lever 303 will be resting against the contact point 307, which will cause the current to pass through the wire 230 through switch "K", and wire 236 to solenoid "L" to energize the same, to cause the mechanism, which has heretofore been described to release the lever 175 from the member 211 and allow the member 212 to be pulled downwardly by spring 222, and this ratchets the platen ready for the writing of a new line.

The escapement mechanism which has previously been described as having the lever 31 has the pin 31a therein working in the slot 315a, which slot appears in the lever 315* which is fixedly secured to the shaft 316, which spans the entire transverse distance of the typewriter, and on the outer end of this shaft 316 is mounted the arm 317 which has the insulated contact point 318 on the upper end thereof to which is connected the wire 347a and this contact member 318 is adapted to press against the contact point 320, which is resiliently supported in the insulated casing 321, which is secured to the sides of the typewriter in an adjustable manner by means of the screws 322 mounted in the slots 323, and from this contact point leads the wire 247, so that each time a key bar is touched and the code and a letter are printed on the paper which is in the typewriter, the contact points 318 and 320 are closed causing a current to pass to the switch mechanism "B" and "D" as will be later described.

Figure 23:
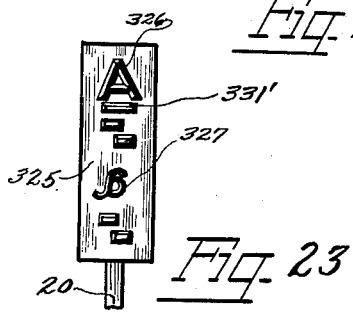
Figure 23 is an enlarged detail view of a type pallet for my typewriter showing the letters and code associated therewith.

By referring to Figure 23 it is seen that each of the type bars 20 has a type pallet which is specially made, and which is designated by the reference character 325. This type pallet has the conventional letters of the alphabet thereon, the capitals being designated by the reference character 326 and the small case letters being designated by the reference character 327. Beneath each of the capital letters I provide a capital letter projection 331', to make the character 331, I have spaces where projections may be placed to print in certain of the squares 328, 329, 330, 332, 333 and 334.

It is thus seen that I have six spaces beneath each letter in which to arrange suitable code indicia, and when a capital letter is desired the space 331 receives an impression filling up this entire space 331 as the projection 331a makes the impression 331 on the copy. Suitable projections are placed on the type pallet to make whatever impression as is desired on the copy. The above description can be more clearly understood by reference to Figures 23 and 41.

A piece of ordinary paper which is designated by reference character 335 is placed in the typewriter and the reporter writes out his report as it would appear in Figure 42, and the perforating mechanism as above described punches the holes 336 along the marginal edges of each side of the paper, and it is thought to be preferable to have these perforations in alinement with the code matter appearing beneath the letters, but I desire it to be understood that these perforations may be placed at any suitable points in the paper, the purpose of these perforations being that when this sheet of typewritten paper with the code indicia appearing with the letter is taken out of the typewriter and placed in a special apparatus on the type-setting machine, that these perforations will fit over the suitable holding means in the type-setting machine mechanism to cause the photo-electric cell mechanism therein to register with the seven spaces beneath each letter, and to travel over these spaces, and to read the code and operate the type-setting mechanism.

It will be seen that I have added a few additional keys to my typewriter mechanism, and by referring to Figure 4 attention is called to the keys designated "thin space", "en space" and "em space", and also on the conventional keys which have the numerals and the letters I have made slight changes as will appear, it being apparent that the type pallet will have thereon what appears on the keys as shown in Figure 4, or any other suitable arrangement.

The regular space bars are designated by the reference character 339 and to the upper portion thereof is secured to the space bar lever 337 which is of any suitable material, and to one of the bars 339 is secured an insulating block 338, said block being secured to the bar 339 by means of the screw 340, and on the lower side of the insulating block 328 is secured a metallic plate 341, (see Figures 3 and 36). Mounted on the base 10 of the typewriter frame is an insulating block 342 on which is secured two spring contact members 343 and 344, the metallic plate when the shift key is pressed downwardly being adapted to connect the two spring contact points 343 and 344 together, so that an electric current can pass therethrough. To the spring contact member 343 is connected a wire 345, which wire is led to one side of a magnet "N", and from the other side of the magnet "N" the wire 347 leads back to one side of the source of current, the above switch being designated by the reference character "M".

Figure 40 shows the alphabet together with all of the other keys, showing the impressions made by each key, and it is apparent that immediately beneath each letter the space 331 is entirely filled, which indicates that the mechanism on the type-setting machine will place a capital letter in the type-setting assembler, and the other square portions which are filled in beneath each letter is the code indicia for the letter desired.

The regular space bar lever 337 which is used to space the words from each other is connected to a key in the typewriter which has a type pallet having the code for the "space band" as shown in Figure 40, and in Figure 42 is shown how this character is placed between words by the pressing of the space bar lever 337.

In Figure 42 I have shown a sentence in the first line thereof which embodies each word of the alphabet, and there appears the code for each letter, as it will appear when written on the sheet of paper by this special typewriter which I have just described. It is of course apparent that any suitable code arrangement may be used, and that the space between the letters and the code may be varied according to the desire of the manufacturer of a special typewriter of this make, and it might be stated that the space in the first line of Figure 42 between the letters of the alphabet and the code matter appearing beneath each letter may be much closer than what is shown, as the photo-electric cell will operate only on the code matter, and it will not be affected by the letters which appear in connection with the code matter beneath the letters, or the letters may be eliminated if desired.

One side of the wire which has been designated by the reference character 346 has a branch 346a leading to solenoid "J", and the branch 346b leading to solenoid "L", the branch 346c leading to the solenoid "C", branch 346d leading to solenoid "F", 346e leads to solenoid "E". The other side of the wiring diagram is designated by the reference character 347, it leads directly to switch "M", which is the switch located beneath the regular space bar, and which has been previously described, and which is shown in perspective in Figure 36.

The branch 347a leads to switch "A", the branch 224 leads to switch "G", branch 347c leads to switch "H", the wire 350 leads from switch "H" to switch "I" or rather to the movable contact point 303, and from one side of this switch "I" the wire 230, as previously described, leads to switch "K", and the wire 236 leads from the other side of switch "K" to the solenoid "L", the other side of the solenoid "L" is connected to the wire 346b, as has been previously described. From the other side of switch "G" to which wire 224, as has already been described, is connected, the wire 227 is led, this wire going to the contact point 130 of the switch mechanism "D", and branching off from wire 227 is the wire 353 which is connected to one side of the resistance coil 354, and from the other side of the resistance coil 354 the wire 355 is connected to one side of the solenoid "F", and from the other side of the solenoid "F", wire 346d is led back to wire 346. The wire 247 which has previously been described as being connected to the movable contact member 242 is led from one side of switch "A", the other side of switch "A" being connected to wire 347a as has previously been described. Connected to wire 247 is wire 247a which leads to plate 129 on lever 121. This plate 129 is supported on the lever 121 by means of an insulating block 121a which separates and insulates the point 129 from the lever 121. The switch mechanism "D" has the contact points 130 and 131 which has previously been described, and from the contact point 131 the wire 245 is led and is connected to the contact point 240 in switch "B" as has previously been described.

The method of operation of my device is as follows:

A piece of ordinary paper such as designated by the reference character 335 is placed in the special typewriter, and the platen and carriage mechanism therefor is pushed to the right by means of the lever 290 which opens the switch "H" and the projection 309 drags the pin 306 in the switch mechanism "I" and forces the lever 303 over against the contact member 308, and when the hand of the operator is released from the lever 290 it goes back to normal position and closes the switch "H", and a current passes through the switch "H", and the parts being in the position shown in Figure 6 with the member 212 in elevated position closing the switch "K" causing the current to pass into solenoid "L" which releases the member 211 from the lever 175 causes the member 212 to be pulled downwardly by the spring 222, which causes the hook 228 (see Figure 3) to pull the lever 45 connected with the ratcheting mechanism for the platen roll in the typewriter, to cause the roll to be turned one space or whatever number of spaces it is set to turn at each operation, and the typewriter is ready for the writing of a new line. Immediately before the above described operation is consummated by the shifting of the platen roll, and while the lever 303 is still against the contact point 308 and after the hand of the operator is released from the lever 290, the current passes through the switch "I", through the wire 310 and passes through the solenoid "J" to energize the same, said solenoid "J" pulling the rod 248, (see Figures 2, 3, 4 and 10) and by observing Figure 11 it can be seen why the perforations 336 are cut in the paper 335.

The rod 248 as it is pulled backward by the solenoid "J" pulls the lever 249 backwardly and partially rotates the shaft 250, on which the lever 251 is fixedly secured, which pushes the lever 252 upwardly, which lever is fixedly secured on the shaft 253, which shaft 253 has on the other end thereof the lever 253a, which presses the perforating levers 254 inwardly, said perforating levers being fixedly secured on the tube 258, which is loosely mounted on the rod 259, and when this is done perforators 255, (see Figures 39 and 40) enter the holes 256 and cut the holes near each edge of the paper. When the perforating operation is performed the pin 311 on the rod 248 moves the lever 312, (see Figures 3 and 4) which pulls the wire 314 which is hooked around the lever 31, and pulls the escapement in the same manner that the keys in the typewriter do when they are depressed to make a letter on the copy, and this provides the space of one letter which is not occupied and thus the lines of typing in code is begun with one space unoccupied. If at the end of the line it is desired to fill in this space with extra spacing material and before the perforating operation is begun, the extra space type bar 274 is depressed, which pulls downwardly the member 275, which causes the member 276 to depress the hook 286 to cause it to engage the pin 280, which is fixedly secured in bar 248, and works in slot 281 in the member 273 and this connects the member 273 to bar 248, and causes the member 273 to pull the rod 272 to move the lever 268 which in turn pulls the member 266 to swing the type bar 264 to cause the extra spacing code as shown in Figure 40 to be printed in this first space, it being understood that there would be no letter above this code memorandum, as it would operate in the type-setting machine purely for the purpose of putting in extra spacing material.

Upon the completion of this extra spacing operation the lever 290 is released and the shifting of the platen in the carriage takes place ready for the typist to begin writing another line.

With the operation of the typewriter mechanism thus far completed, the next step is the actual writing of the message on the paper 335. Let us suppose that the capital letter "T" is struck by the finger of the operator which will cause the capital "T" to be printed on the paper as appears in Figure 42, together with the code as appears thereunder, the top portion of the code indicating that it is a capital letter, and the square to the left hand lower portion thereof indicates the code for the letter "T". When the key bar is depressed to write a letter such as for example the capital letter "T" as above described, the hooks 30 on each of the key bars will pull the transversely disposed member 31 forwardly in the escapement mechanism, the pin 31a which is fixedly secured in the lever 31, and which works in the slot 315a in the lever 315, which lever 315 is secured on the shaft 316 will close the switch mechanism "A" shown in Figure 24 and which has previously been described, and the current after passing through the closed switch "A" passes through the wire 247 to movable contact member 242, and through wire 244 to the magnet "E" which draws lever 121 inwardly to close switch "D", (see Figure 28) which lever 121 presses against the point 120 pressing portion 119 against the disk 107 to lock the shaft 88 and the disk 107 together for the time being.

The current then passes through the wires 227, 353, resistance coil 354 and wire 355 through magnet "F" releasing brake mechanism 133 to allow the disk 107 and the shaft 88 to be moved while the energization of magnet "C" is taking place the current will then pass through wires 245 and 246 through magnet "C" and out through wire 346c, and when magnet "C" is energized the lever 92 which is loosely secured on shaft 88 will be pulled downwardly, and cause movable contact 242 which is secured on lever 92 to shift over to the contact point 240, thereby moving the current from magnet "E" which will open switch "D" and releases the pressure of point 120 to release the pressure of brake 119 against wheel 107, and magnet "C" is still energized, and with the lever 92 being pulled downwardly, and the rod 95 pulling against projection 94 which is fixedly secured to the shaft 88 causes a partial revolution of the shaft 88, which forces the lever 87 backwardly, and this in turn forces the rod 80 backwardly against the compression spring 84, and causes the plates 72 and 73 to press toward the projection 69, and the projection 69 will enter into either the notches 70 or 71 depending upon whether or not a capital letter is being written or a lower case letter. It might here be mentioned that the notches 70 and 71 are of different depths, the depth of the notches being cut accurately to agree with the amount of space which the particular letter will occupy in a type-setting machine, so it is evident that some letters will require more space than others, and the depth of the notches will determine how far back the rod 80 can move and likewise will determine how far shaft 88 will be turned, which in turn determines the amount of turning movement which is given to the disk 107.

The switch "D" remains closed until after the lever 92 is pulled downwardly, which causes the disk 107 to be locked to the shaft 88, and this gives the desired rotation to wheel 107. When the letter is printed and the above operations have been carried out, the finger of the operator of course releases the pressure of the type bar, which operation is almost instantaneous as the typewriting is done in the conventional manner, but the return of the key bar to normal position opens switch "A" and allows lever 92 to return upwardly to normal position, which causes the solenoid "E" to be de-energized and the braking effect on the point 120 is released, and the solenoid "F" is de-energized and allows the rod 140 to move upwardly as shown in Figure 4 to cause the permanent brake 133 to clamp the disk 107 and to lock it in position until another key is touched when the above operation will be repeated.

When the space bar is depressed closing the switch "M" the magnet "N" will be energized as has already been described. When this magnet is energized it pulls the pivoted member 196 toward the magnet "N", and moves the pivoted dog member 190 also toward the magnet "N", and causes the pawl thereon to engage the next succeeding tooth on the wheel 193, and advances the ratchet wheel 193 and the shaft 194 and the coiled spring 198 turns the dog 190 to the position shown in Figure 4 to abut against the projection 190a which limits the forward travel of the pawl 190.

The pivoted dog 191 is normally pressed inward against the ratchet wheel 193 by means of the spring 192, so that when the ratchet wheel is advanced by the operation of the magnet "N" and the dog 190, the projection of the dog 191 will fall into the next succeeding notch and hold the shaft against rotation backward due to the drag of the dog 190, as it is pulled backward when the magnet "N" is energized.

As the shaft 194 is rotated by the moving of the ratchet wheel as above described, it is evident that it will turn the cams 203 and 204 which press against the indicator members 205 and 206 and force them to the left-hand in Figures 15 and 17. Each notch on the ratchet wheel above described indicates the expansion of one space band in a type-setting machine, the shaded portion 205a indicates the total amount of expansion of the space bands which have already been used in the line thus far. The shaded portion 206a indicates the total thickness of all the thin spaces which may be added in connection with the space bands as shown in the indicating portion 205a, so that it is apparent that if the total spread of the section 205a and 206a will equal the distance of space between the pointer 171 and the right hand edge of space 170, then the typist knows that the space bands which he has already in the line can be expanded to fill out a complete line without adding any more letters or additional space bands. It is therefore seen that when a letter is touched as above described and printed on the typewritten sheet, that the indicator 168 will be moved, and that the indicating point 171 indicates the amount of space in a line of a line-casting machine which has been actually filled by the letters themselves, and space bands also, and the two bottom indicators 205 and 206 indicate the total amount of expansion which can be made available in the space bands which are already set in the line.

I have not shown a special key for blotting out mistakes, but I desire it to be understood that I may provide one type pallet which will blot out all of spaces 328 to 334 inclusive, so I can render any code matter beneath any letter so it will not have any effect on the type-setting mechanism.

In the drawings and specification I have set forth a preferred embodiment of my invention, and although specific terms are employed they are used in a generic and descriptive sense only, and not for purposes of limitation, the scope of the invention being set forth in the appended claims:

I claim:

1. In a typewriter having a platen, a shift lever for said platen, means for perforating both of the marginal edges of a piece of paper in said typewriter, means operable by a release of the shift lever for automatically operating said perforating means.

2. In combination with a typewriter having a uniform paper feed, means adapted to be operated upon the striking of a key bar to measure the amount of space occupied in regular line printing by a particular character and to indicate the amount of space on a registering device, means for indicating the total amount of space bands and characters in a line at a given time and means for indicating the expansibility of the space bands in a line, and means for indicating the amount of thin spaces which may be added.

3. In a typewriter having a platen, shifting means for said platen, means for printing both a legible copy of characters and code matter at the same operation associated therewith, means operable upon a release of the shifting means for perforating the marginal edges of the paper and for automatically advancing the platen of the typewriter immediately after the perforation.

4. In a typewriter for preparing a control sheet for operating a type-casting machine, means for writing at the same time both legible characters and code matter associated with each character, means for indicating the amount of space occupied by legible characters and space bands, means for indicating the amount of thin spaces which may be added, and means for indicating the expansibility of the space bands already in the line at anytime during the writing of a line.

5. In a typewriter for preparing a control sheet, means for writing at the same time both legible characters and code matter associated with but removed from each of the legible characters, means for indicating the amount of space occupied in the line at a given time by the characters and space bands in the line, means for indicating the expansibility of the space bands in the line at a given time, means for perforating the marginal edges of the paper and means for printing an extra space code characteristic during the perforating operation, and means for advancing the paper after the perforating operation has been completed.

6. In a typewriter mechanism having a platen and type bars, said type bars having means thereon for printing at the same time both a legible character and an imperforate code characteristic associated with but removed from each character, a carriage shift lever for returning the carriage to initial position, means operable by said shift lever for perforating the marginal edges of the paper and means operable by the shift lever while in normal position for advancing said platen to a new line position.

7. In a typewriter for preparing a control sheet, a platen, means for moving a sheet of material through said typewriter and over said platen, means on the type bars of said typewriter for imprinting on the sheet of material both legible characters and code matter associated with but removed from the said legible characters, means for placing code characteristics in association with said legible characters to indicate spacing, means between one type bar and the space lever of the typewriter for placing a spacing characteristic between the words as written by the typewriter, means for measuring the space occupied by each character in the line, means for indicating the expansibility of space bands already in the line, and means for perforating the marginal edges of the sheet of material at the finish of the writing of a line, and means for advancing the platen immediately after the perforating operation to begin the writing of a new line.

8. In combination with a typewriter, a registering device having means for moving the same to indicate the space required for the different characters in properly spaced printing, means for indicating the amount of space occupied by characters and space bands in a line at a given time, means for indicating the amount of thin spaces which may be added to a line at a given time, and means for indicating the expansibility of the space bands in a line at a given time.

9. A typewriter having means for printing a legible message on a sheet of material, means for perforating the sheet of material at the finish of each line, means for printing characters in association with but removed from each letter on said sheet of material, means for printing other indicating characters to cause a type-setting machine to be operated thereby, means for determining the space a given character will occupy in a type-setting machine, means for indicating the amount remaining of a line, means for indicating the expansibility of the space bands which have been placed in the line, and means for indicating the amount of thin spaces which can be added to a line.

10. A typewriter having means for making a legible copy with printed code characters associated with each legible character but removed therefrom, means for automatically indicating the amount of space a plurality of letters and space bands will occupy in a line of type in a type-setting machine so as to enable the operator engaged in making the copies to determine the length of lines in said copy, means for perforating both of the marginal edges of said copy, means for advancing the carriage to a new line position after the perforating operation and means for indicating the expansibility of the space bands which have already been indicated in a line on said sheet of material.

11. In a typewriter adapted to prepare a control sheet for operating a type-setting machine, means for placing on said control sheet legible characters, means for placing code characteristics in association with each of said legible characters, means for placing code characteristics alone, means associated with said typewriter for indicating at all times the length of space which the line at any given time will occupy in a type-setting machine, means for perforating the sheet of material, means for indicating the amount of space left in any particular line as written, and means for indicating the expansibility of space bands which have been placed in the line thus far written by the typewriter at any given time.

12. A typewriter having means thereon for measuring the space occupied by characters in regular line printing, and for measuring the space bands in a line, means for indicating the expansibility of the space bands already in the line, and means for indicating the amount of thin spaces which may be added to a line.

13. In a typewriter having a platen mounted in a carriage mechanism, means for progressing the carriage mechanism step by step upon the actuation of the type bars in the typewriter, means for shifting the carriage to starting position, means on the type bars for imperforately printing simultaneously both a legible character and code characters associated with but removed from the legible character, means operable by the shifting mechanism of the platen for perforating the marginal edges of the paper contained within the typewriter, and means operable upon a release of the shifting lever of the platen for automatically turning the platen to a new line.

14. In a typewriter for preparing a control sheet, a plurality of type bars, means on the type bars for printing both legible characters and code characters simultaneously, a platen adapted to receive a sheet of material on which the printing is done, means associated with the type bars for operating the same, measuring means on the typewriter adapted to be operated by the operation of the type bars to measure the space occupied by a character in regular line printing, means associated with the measuring means for indicating the amount of space which the characters and spaces already printed will occupy in regular line printing at a given time, means for indicating the amount of thin spaces which may be added in a line of regular line printing at a given time, and means for indicating the expansibility of the space bands in a line of regular line printing.

15. In a typewriter for preparing a control sheet, a carriage frame, a platen, a lever for returning the carriage frame and platen carried thereby to a position to begin the writing of a new line, said carriage and platen being adapted to receive a sheet of material on which writing is adapted to be placed by the typewriter, means associated with said carriage and platen for perforating the marginal edges of the paper, and means operable by said carriage return lever for automatically shifting the platen to a new line position upon a release of the carriage return lever.

16. In a typewriter having type bars and means for operating the same and also having a conventional carriage mechanism with a platen therein, means on the type bars of said typewriter for printing at the same time both legible characters and code characters associated with but removed from the legible characters, perforating means for perforating the marginal edges of the paper, means associated with the perforating mechanism and being adapted to be selectively connected to the perforating mechanism for placing a code character at the beginning of a line to indicate a space band in said line.

17. In a typewriter having type bars and means for operating the same and also having a conventional carriage mechanism with a platen therein adapted to receive a sheet of paper, means on the type bars of said typewriter for printing a set of code characters, perforating means for perforating the marginal portions of the paper, means associated with the perforating means and being adapted to be selectively connected to the perforating mechanism for placing a code character at the beginning of a line to indicate a space band in said line.

18. In a typewriter having type bars and means for operating the same and also having a carriage mechanism adapted to receive a sheet of paper, means on the type bars for printing code characters, means for perforating the marginal edges of the paper, and means adapted to be selectively connected to the perforating means for placing a code character at one end of the printed line on said sheet to indicate a space band.

19. Means for preparing a control sheet comprising a plurality of type bars having means thereon for printing code characters on a sheet of material, means for measuring and indicating the amount of characters and space bands in a line, means for indicating the expansibility of the space bands in a line, and means for indicating the amount of thin spaces which may be added to a line at a given time.

20. Means for producing a control sheet for typesetting machines comprising means for placing code characters on said control sheet, means for measuring and indicating the space occupied in a line by all characters indicated on said control sheet, means for indicating the expansibility of all space bands in the line, and means for indicating the amount of thin spaces which may be added to the line.

21. In a typewriter for preparing a control sheet, means for writing code characters to indicate characters to be controlled, means for indicating the amount of space occupied in the line at a given time by the characters and space bands written in the line, means for indicating the expansibility of the space bands written, means for placing a spacing characteristic at one end of a line, means for perforating both marginal edges of said control sheet, and automatic means for advancing said control sheet to a new line position after the perforating operation has been completed.

22. In a typewriter mechanism having a carriage and platen mechanism and type bars, means on each type bar for printing a code character, a carriage shift lever for returning the carriage to initial position, means operable upon a release of the shift lever for perforating the marginal edges of a sheet in said typewriter, and other means controlled by the perforating means for turning said platen to a new line position.

23. In a typewriter for preparing a control sheet, said typewriter having a platen and a plurality of type bars, means for moving said platen and said sheet, means on the type bars for printing characters on the control sheet to indicate legible characters, means on one type bar to indicate a space band, connections between said space band type bar and the space lever of the typewriter, means for measuring and indicating the amount of space occupied by characters and space bands, means for indicating the expansibility of the space bands and means for indicating the amount of thin spaces which may be added to a line.

24. In a typewriter for preparing a control sheet, said typewriter having type bars and a platen and carriage mechanism, means on some of the type bars for printing a code characteristic to indicate a legible character, means on at least one other type bar for printing a code characteristic to indicate characters other than legible characters, means for measuring and indicating the amount of space all characters will occupy in regular line printing, means for indicating the amount of space remaining in a line, means for indicating the expansibility of space bands in a line, and means for indicating the amount of thin spaces which may be added to a line.

25. A typewriter for preparing a control sheet for typesetting machines, means for printing a set of code characteristics for each of the characters in a typesetting machine, means for measuring and indicating the amount of space all characters written will occupy in regular line printing, and also for indicating the amount of space remaining in the line, means for perforating both of the marginal edges of said control sheet, means for indicating the expansibility of all space bands in the line, and means for indicating the amount of thin spaces which may be added to the line.

26. In a typewriter having a platen mounted in a carriage mechanism for receiving a sheet of material and also having type bars and means for advancing said carriage step by step upon the operation of the type bars, means for shifting said carriage to starting position, means on the type bars for printing code characteristics, means operable by a release of the shifting means for perforating the marginal edges of the sheet, and means controlled by the perforating mechanism for automatically turning the platen to a new line.

27. In a typewriter for preparing a control sheet, said typewriter having one type bar for printing both lower case and capital letters, means for measuring and indicating the space which all characters printed in a line at a given time will occupy in a line of regular printing, means for indicating the expansibility of the space bands in a line, and means for indicating the amount of thin spaces which may be added to a line.

28. In a typewriter for preparing a control sheet, means for printing code characteristics for legible characters, means for selectively placing additional code matter with a code character to indicate the case of the character, means for measuring and indicating the space occupied in a line of regular line printing at a given time, means for indicating the expansibility of all space bands represented by space band characteristics in the line, and means for indicating the amount of thin spaces which may be added to the line.

29. A typewriter for preparing line for line copy for a typesetting machine, means for measuring each character printed by the typewriter and for indicating the amount of space said character will occupy in line for line printing, means for measuring and indicating the space bands in a line, means for perforating the marginal edges of the printed sheet, means for indicating the amount of thin spaces which may be added to the line, and means for indicating the amount of expansion which may be imparted to the space bands already in the line.

30. A typewrter for preparing line for line printing for use in setting type in a type-setting machine and having a carriage and platen adapted to receive a sheet on which the writing is printed, a shift lever for returning the carriage and platen to a position to begin the writing of a new line, means for perforating the marginal edges of the sheet, electrical means for operating the perforating means, a switch, means on the carriage for closing the switch when the carriage is moved to a position to write a new line, a second switch, a shift lever forming a part of said second switch, pressure on the shift lever opening said second switch and release of pressure on the shift lever closing said second switch to cause the perforating means to be operated when said switches are in closed position, and means associated with said first switch for moving the platen to a new line position after said perforating operation has been completed.

31. A typewriter for preparing a control sheet for a light actuated cell mechanism, said typewriter having a plurality of type bars operatively mounted therein, some of said type bars having duplicate legible characters of different case thereon and spaced apart from each other, and a plurality of parallel rows of projections on some of said type bars in close proximity to each legible character for printing two parallel lines of cell controls immediately beneath its identifying character on said control sheet to indicate the legible character, when the typewriter is operated as in ordinary writing.

32. A typewriter for preparing a control sheet for a light actuated cell mechanism, said typewriter having a plurality of type bars operatively mounted therein, means for operating the type bars as in ordinary writing, each type bar having at least one legible character thereon, some of said type bars having a plurality of parallel lines of projections in close proximity to said legible character for printing cell controls on said control sheet representing said legible characters, the projections being confined in a space whose lateral width is confined to the space alloted to the character on the control sheet.

33. In a typewriter having type bars and means for operating the same and also having means for receiving a sheet of material, means on the type bars for printing a set of code characters, perforating means for perforating the edge portions of said sheet and means associated with the perforating means and having means for selectively connecting the same to the perforating means for placing a code character at the beginning of a line to indicate a space band in said line.

34. In a typewriter having type bars and means for operating the same and also having means for holding a sheet of material, means on the type bars for printing code characters, means for perforating the marginal edges of the sheet, and means adapted to be selectively connected to the perforating means for placing a code character at one end of the printed line.

35. Means for preparing a control sheet for typesetting, typecasting and like machines comprising a typewriter having a carriage and a plurality of separately movable members for printing code characters on a control sheet to form a line having a predetermined margin at the starting end thereof and means automatically and selectively operable upon return of the carriage to starting position for printing a code character in said margin in alignment with the line, after the printing of said line, to indicate space members.

36. Means for preparing a control sheet for typesetting, typecasting and like machines comprising a plurality of members for printing code characters on a control sheet to form a line having a predetermined margin at the starting end thereof and means for printing a code character in said margin in alignment with the line, after the printing of said line, to indicate space members, and means operable after a predetermined portion of the line has been written for indicating the amount of space occupied by characters already written.

37. Means for preparing a control sheet for typesetting, typecasting and the like machines comprising a plurality of members for printing code characters on a control sheet to form a line having a predetermined margin at the starting end thereof and automatic and selectively controlled means for printing a code character in said margin in alignment with the line, after the printing of said line, to indicate extra space members, means operable after a portion of the line has been written for indicating the amount of space occupied by characters already written, and additional means for indicating the expansibility of space members in the line at any given time.

38. Means for preparing a control sheet for typesetting, typecasting and like machines comprising a typewriter having a carriage and a plurality of type bars for printing code characters on a control sheet corresponding to each letter of the alphabet and means for printing on the control sheet a code character for effecting the selection of capital letters, and automatic and selectively controlled means for printing on said control sheet a code character in the margin at the beginning of a line upon return of the carriage for effecting the introduction of extra space members in the line when the control sheet is utilized in a typesetting, typecasting or like machine.

39. A typewriter having means thereon for measuring and indicating at a given time the space in a line occupied by characters identifying both legible symbols and spaces between certain of said symbols, means for indicating the expansibility of the spacing members necessary to occupy the spaces between the legible symbol identifying characters and means for indicating the space members which may be added to the line to expand the same to its required length.

40. Means for preparing a control sheet for use in typesetting, typecasting, and like machines, comprising a typewriting mechanism provided with type bars and a carriage mechanism for receiving a sheet of paper, means on the type bars for printing code indicia, means for measuring and indicating at any given time the amount of space in a line occupied by code indicia for both legible characters and spaces, means for indicating the expansibility of a line and means for indicating the space members which may be added to the line.

41. In a typewriter for preparing a control sheet for use in typesetting, type casting and like machines, type bars for printing code indicia to indicate legible characters, at least one additional type bar for printing code indicia to indicate spaces between certain of the legible character code indicia, means for measuring and indicating the amount of space in a line occupied by all code indicia previously written therein, means for indicating the expansibility of the line and means for indicating the space members which may be added to the line to expand the same to the desired length.

42. A typewriter for preparing a control sheet for use in automatically operated typesetting and typecasting machines comprising means for printing a set of code indicia for each of the characters in the typesetting or casting machine in which the control sheet is to be used, means for measuring and indicating the amount of space all characters written including spaces between certain characters thereof occupy in a line, means for indicating the expansibility of the line, and means for indicating the spaces which may be added to the line to bring the same to the requisite length.

43. In a typewriter having type bars, means on the type bars for printing code indicia on a sheet of paper, means for perforating the marginal edges of the paper and means actuable by said perforating mechanism for placing a code indicia at the beginning of a previously written line.

44. A method of preparing a control sheet for actuating character selecting means which comprises arranging a plurality of code indicia on said sheet to form a line for line copy of said code indicia representing characters to be selected, then placing a code indicia at the beginning end and in advance of at least one of the lines to cause said character selecting means to form justified lines of selected characters.

45. Means for preparing a control sheet for a light sensitive cell mechanism for typesetting, typecasting and like machines comprising a plurality of members for printing cell controls on a control sheet to form a line having a predetermined margin at the starting end thereof and means for printing cell controls in said margin in alignment with the line, after the printing of said line, to indicate space members.

46. Means for preparing a control sheet for a light sensitive cell mechanism for typesetting, typecasting and like machines comprising a plurality of members for printing cell controls on a control sheet to form a line having a predetermined margin at the starting end thereof and means for printing a cell control in said margin in alignment with the line, after the printing of said line, to indicate space members, and means operable after a portion of the line has been written for indicating the amount of space occupied by characters already written.

47. Means for preparing a control sheet for a light sensitive cell mechanism for typesetting, typecasting and the like machines comprising a plurality of members for printing cell controls on a control sheet to form a line having a predetermined margin at the starting end thereof and means for printing a cell control in said margin in alignment with the line, after the printing of said line, to indicate extra space members, means operable after a portion of the line has been written for indicating the amount of space occupied by characters already written, and additional means for printing a cell control for effecting and indicating the expansibility of space members in the line at any given time.

48. Means for preparing a control sheet for a light sensitive cell mechanism, comprising a plurality of members for printing cell controls on the control sheet including space band characters, means for measuring and indicating the amount of space occupied by said characters in a line, means for indicating the expansibility of the space bands present in the line, means for causing lost motion in the indication of the space occupied by the characters during the printing of the initial portion of the line, and selectively operable automatic means for placing a code character in the space at the beginning of a line already written before the control sheet is moved to new line position.

49. Means for preparing a control sheet for a light sensitive cell mechanism, comprising a plurality of members for printing cell controls on the control sheet including space band characters, means for measuring and indicating the amount of space occupied by said characters in a line, means for indicating the expansibility of the space bands present in the line, and means for causing lost motion in the indication of the space occupied by the characters during the printing of a variable predetermined portion of the line, and selectively operable automatic means for placing a code character in the space at the beginning of a line already written before the control sheet is moved to new line position.

50. Means for preparing a control sheet for a light sensitive cell mechanism for actuating typesetting, typecasting machines and the like, comprising a plurality of members for printing cell controls on the control sheet including space band characters, means for measuring and indicating the amount of space occupied by said characters in a line, means for indicating the expansibility of the space bands present in the line, the means for measuring and indicating the amount of space in the line occupied by characters having connected therewith adjusting means for setting the same to initiate operation thereof only after a predetermined portion of the line is occupied, and selectively operable automatic means for placing a code character in the space at the beginning of a line already written before the control sheet is moved to new line position.

51. Means for preparing a control sheet for a light sensitive cell mechanism for actuating typesetting, typecasting and the like machines comprising means for printing a legible character and means for printing two parallel lines of cell controls immediately beneath a legible character on a control sheet to form a code corresponding to some of the legible characters of the alphabet and means for printing on the control sheet a cell control for effecting the selection of high case characters when the control sheet is employed in actuating typesetting, typecasting and like machines.

52. Means for preparing a control sheet for a light sensitive cell mechanism for actuating typesetting, typecasting and like machines comprising means for printing cell controls on a control sheet corresponding to each letter of the alphabet and means for printing on the control sheet a cell control in the margin at the beginning of a line for effecting the introduction of extra space members in the line when the control sheet is utilized in a typesetting, typecasting or like machine.

53. In a typewriter for preparing a control sheet for use in a light sensitive cell mechanism for actuating typesetting, typecasting and like machines, type bars for printing cell controls to indicate legible characters, at least one additional type bar for printing cell controls to indicate spaces between certain of the legible character cell controls, means for measuring and indicating the amount of space in a line occupied by all cell controls previously written therein, means for indicating the expansibility of the line and means for indicating the space members which may be added to the line to expand the same to the desired length.

54. A typewriter for preparing a control sheet for use in a light sensitive cell mechanism for actuating typesetting and typecasting machines, comprising means for printing a set of cell controls for each of the characters in the typesetting or casting machine in which the control sheet is to be used, means for measuring and indicating the amount of space all characters written including spaces between certain characters thereof occupy in a line, means for indicating the expansibility of the line, and means for indicating the spaces which may be added to the line to bring the same to the requisite length.

55. A method of preparing a control sheet for actuating a light sensitive cell mechanism for controlling character selecting means which comprises arranging a plurality of cell controls on said sheet to form a line of said cell controls, then placing a cell control at the beginning end and in advance of the line to cause said character selecting means to form a line of the requisite length.

56. Means for preparing a control sheet for typesetting, typecasting and the like comprising means for printing code characters on a control sheet corresponding to each letter of the alphabet and means operable by return of the carriage for printing a code character at the beginning of the line to control justification of the line, and means for printing on the control sheet a code character for effecting the selection of capital letters when the control sheet is employed in a typesetting, typecasting or like machine.

57. Means for preparing a control sheet for use in actuation of typesetting, typecasting and like machines comprising means for printing two parallel lines of cell controls for some of the characters to be selected and forming code characters on a control sheet corresponding to each letter of the alphabet and means for simultaneously printing on the control sheet along with the printing of the code character for controlling the selection of characters, an additional code character for effecting the selection of capital letters when the control sheet is employed in a typesetting, typecasting or like machine.

58. Means for preparing a control sheet for typesetting, typecasting and like machines comprising a typewriter having a carriage and a plurality of type bars, means for printing code characters on a control sheet corresponding to each letter of the alphabet and means for printing simultaneously with the printing of the code characters on the control sheet another code character for effecting the selection of capital letters, and selectively controlled automatic means for printing on the control sheet a code character in the margin at the beginning of the line and selectively operable upon return of the carriage for effecting introduction of extra space members in the line when the control sheet is utilized in a typesetting, typecasting and like machines.

59. A method of preparing a control sheet for actuating character selecting means which comprises forming a plurality of lines on a control sheet of a plurality of code indicia to form a line for line copy of the characters to be selected by the character selecting machine and then placing a code indicia in advance of the beginning of at least some of the lines to cause said character selecting means to form justified lines of selected characters.

60. A typewriter for preparing a control sheet for light sensitive cell mechanism having separately operable type bars therein, some of said type bars having means thereon for printing simultaneously a legible character and a plurality of parallel lines of light sensitive cell controls when operated as in ordinary writing, the cell controls being confined in a space whose lateral width is not greater than the width alloted to the character on the control sheet.

61. A typewriter for preparing a control sheet for light actuated cell mechanism having a plurality of type bars therein, each type bar having two legible characters thereon and spaced apart from each other, a plurality of projections associated with each character for printing two parallel lines of cell controls on the control sheet for some of the characters when the type bars are actuated as in ordinary writing to indicate a legible character, an additional projection associated with the projections for one of the legible characters on a type bar for printing on said sheet a cell control for high case characters to indicate the case of such characters.

62. A typewriter for preparing a control sheet for light actuated cell mechanism and having a plurality of type bars therein of approximately equal width, each type bar having a legible character thereon in duplicate and spaced apart from each other and being disposed one above the other, a plurality of projections associated with some of the characters for printing cell controls on said control sheet to indicate the legible character and an additional projection associated with the code character for the higher case of the character for printing on said sheet a cell control for high case characters to indicate the case of such characters.

63. A typewriter for preparing a control sheet for light actuated cell mechanism, said typewriter having a plurality of type bars of approximately equal width operatively mounted therein, some of said type bars having duplicate legible characters of different case thereon and spaced apart from each other, a plurality of parallel rows of projections on some of said type bars in close proximity to each legible character, the projections functioning for printing cell controls on said control sheet corresponding to the legible character.

64. Means for preparing a control sheet for a light sensitive cell mechanism for actuating typesetting, typecasting and like machines comprising means for printing cell controls on a control sheet corresponding to each letter of the alphabet, a carriage mechanism for holding the control sheet, means for returning the carriage to starting position, and selectively operable means automatically operable by the return of the carriage mechanism for printing at the beginning of a line already written on the control sheet a cell control for effecting justification of the line when the control sheet is employed in typesetting, typecasting and like machines.

65. Means for preparing a control sheet for light sensitive cell mechanism for actuating typesetting, typecasting and like machines comprising means for printing cell controls on a control sheet corresponding to each letter of the alphabet and selectively operated automatic means for printing on the control sheet a cell control in the margin at the beginning of the line for effecting the introduction of extra space members in the line when the control sheet is utilized in a typesetting, typecasting or like machine.

66. Means for preparing a control sheet for a light sensitive cell mechanism for actuating typesetting, typecasting and the like machines comprising a typewriter having a carriage and type bars for printing cell controls on a control sheet corresponding to each letter of the alphabet and means operable by a return of the carriage for printing on the control sheet a cell control for effecting justification of the line of type in typesetting, typecasting and like machines.

67. In a typewriter having a carriage and a rotatable platen mounted therein, means for returning the carriage to initial starting position, an electric switch on the carriage held in open position by the returning means as the carriage is returned to starting position, means operable upon release of the returning means for moving the switch to closed position, and means controlled by said switch for moving the platen to new line position.

68. A typewriter having a plurality of separately operable type bars, and each type bar on its face having raised means for printing a type character and having associated therewith one or more raised projections for simultaneously printing one or more dots immediately below the character in the space allotted to said character by the spacing mechanisms of the typewriter, said projections being arranged to print said dots in different horizontal and vertical lines to thereby form a row of characters, each arrangement of dots below each character forming a printed code representation of said character.

69. A typewriter having individual type bars some of which are provided with a raised portion for writing a character and having also immediately beneath the character portion one or more projections for writing one or more dots forming a code representation of such character.

70. In a typewriter for preparing a control sheet to be employed in photo-electric means for operating and controlling a linecasting machine and the like, a plurality of individual type bars each provided with means for writing a legible character and other means disposed immediately beneath the means for writing the character for writing a code combination to be scanned by said photo-electric-means.

71. In a typewriter for preparing a control sheet to be employed in light sensitive means for controlling the operation of a linecasting machine and the like, a plurality of type bars, each provided with means for writing a legible character and some of the type bars also being provided with other means for writing below the character in the lateral space allowed to the character by the spacing mechanism of the typewriter and in the vertical space appearing between ordinary double space lines, a code combination comprising a plurality of dots adapted to be scanned by said light sensitive means for reproducing the character appearing thereabove in the linecasting machine and the like.

72. A typewriter for preparing a control sheet comprising a printing ribbon and a plurality of individual type bars and the face of each type bar having means thereon for printing, in cooperation with the ribbon, on the control sheet a legible character, and each type bar having on the face thereof and disposed below the means for printing the legible character, other means for writing at the same time the legible character is printed at least one dot to serve as a code characteristic for the legible character.

73. A type writer for preparing a control sheet for actuating light sensitive means and having a ribbon and a plurality of individually operable type bars, each bar on its face having means for simultaneously printing a legible character and at least one control for a light sensitive means, said control being immediately beneath the character in the lateral space allotted to the legible character on the sheet and within the space ordinarily allowed by the typewriter between the lines in double space writing.

74. That method of preparing on a typewriter a control sheet to be used to control character reproducing machines, such as linecasting machine which comprises writing a plurality of lines of control characters on the sheet with each line having the requisite number of characters and justification control symbols which would cause the reproducing machine when actuated thereby to reproduce justified and unjustified lines, and placing in advance of the beginning of said unjustified lines a control symbol to effect proper justification of said lines.

75. A typewriter for preparing a control sheet for light sensitive cell mechanism and having type bars therein, said type bars having means thereon immediately beneath the identifying type character for printing on the control sheet two parallel lines of light sensitive cell controls for some of the characters written, and for printing a cell control or controls in a single line for other characters written.

76. In a typewriter for preparing a control sheet to be employed in photo-electric means for operating and controlling a line casting machine and the like, a plurality of individual type bars each provided with means for writing a legible character on a page, and other means for writing on the same page one or more dots to form a code combination to be scanned by said photo-electric means.

77. A method of preparing a control sheet for actuating character selecting means which comprises forming a plurality of lines on a control sheet of a plurality of code indicia to form a line for line copy of the characters to be selected by the character selecting machine and placing a code indicia at the beginning of some of the lines to cause said character selecting means to form justified lines of characters.

78. Means for preparing a control sheet for operating a light sensitive cell mechanism for typesetting, typecasting, linecasting and like machines comprising a plurality of members for printing cell controls on a control sheet to form a line having a predetermined margin at the starting end thereof and means for printing cell controls in said margin in alinement with the line to control the light sensitive mechanism to place extra space members in the line.

79. Means for preparing a control sheet for actuating character reproducing machines and comprising means for writing lines of legible characters and writing simultaneously with the writing of a legible character one or more dots immediately below the legible character to serve as a code for controlling light sensitive means for said character reproducing machine.

80. Means for preparing a control sheet for controlling light sensitive means in a character reproducing machine and which comprises means for writing lines of legible characters on the sheet and means operable simultaneously with the writing of a legible character for writing one or more dots for each legible character on the control sheet between two lines of legible characters to serve as a code for the legible characters in one of the proximate lines of legible characters.

81. A typewriter having means for writing lines of legible characters on a suitable sheet and also having means for writing below each character one or more dots to serve as a code for controlling light sensitive means associated with a character reproducing machine.

BUFORD L. GREEN.